US012241303B2

(12) United States Patent
Lin et al.

(10) Patent No.: US 12,241,303 B2
(45) **Date of Patent: *Mar. 4, 2025**

(54) ROTATION DEVICE FOR A TURNSTILE

(71) Applicant: FOSITEK CORPORATION, New Taipei (TW)

(72) Inventors: Chun-Han Lin, New Taipei (TW); Yung-Chih Tseng, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 42 days.

This patent is subject to a terminal disclaimer.

(21) Appl. No.: 18/149,459

(22) Filed: Jan. 3, 2023

(65) Prior Publication Data

US 2024/0076939 A1 Mar. 7, 2024

(30) Foreign Application Priority Data

Sep. 7, 2022 (TW) ................................. 111133913

(51) Int. Cl.
*E06B 11/08* (2006.01)

(52) U.S. Cl.
CPC .................................... *E06B 11/08* (2013.01)

(58) Field of Classification Search
CPC ....................................................... E06B 11/08
USPC ........................................................ 49/46, 47
See application file for complete search history.

(56) References Cited

U.S. PATENT DOCUMENTS 2,204,897 A * 6/1940 Kilpatrick ............. G07F 17/145 49/70
3,914,902 A * 10/1975 Lamberson ............. E06B 11/08 49/47
3,998,008 A * 12/1976 Collins ................... G07F 17/14 49/47
5,072,543 A * 12/1991 Tetherton ................ E06B 11/08 49/47
(Continued)

FOREIGN PATENT DOCUMENTS

CN 103620143 A * 3/2014 ........... E05F 1/1207
CN 109314347 A 2/2019
(Continued)

OTHER PUBLICATIONS

Taiwanese Search Report for Taiwanese Application No. 111133913, dated Sep. 19, 2023, with an English translation.

*Primary Examiner* — Jerry E Redman
(74) *Attorney, Agent, or Firm* — Birch, Stewart, Kolasch & Birch, LLP

(57) ABSTRACT

A rotation device includes a base seat, an axle unit, a lower rotating module and an upper rotating module. The axle unit includes an upper axle and a lower axle. The lower rotating module includes a lock unit, and an outer barrel that is disposed in the base seat and that is penetrated by the lower axle. The lock unit includes a lock plate that is sleeved on the lower axle, and a lock member that is mounted to the base seat. The lock plate is formed with a first lock groove. The lock member has a lock portion that is operable to move into the first lock groove. The upper rotating module is disposed in the base seat and is co-rotatably sleeved on the upper axle. The upper rotating module is able to be driven by the upper axle to rotate relative to the lower rotating module.

14 Claims, 43 Drawing Sheets

(56) References Cited

U.S. PATENT DOCUMENTS

| | | | | |
|---|---|---|---|---|
| 5,471,795 | A * | 12/1995 | Gallenschutz | E06B 11/08 49/141 |
| 6,715,234 | B1 * | 4/2004 | Libardi | G07F 17/145 49/46 |
| 11,415,200 | B2 | 8/2022 | Hsiao et al. | |
| 2009/0007379 | A1 * | 1/2009 | Zhang | G06F 1/1681 16/295 |
| 2014/0102003 | A1 * | 4/2014 | Talpe | E06B 11/08 49/46 |
| 2024/0076906 | A1 * | 3/2024 | Lin | E05B 65/00 |
| 2024/0076921 | A1 * | 3/2024 | Lin | E05F 1/105 |
| 2024/0076939 | A1 * | 3/2024 | Lin | E06B 11/085 |

FOREIGN PATENT DOCUMENTS

| | | | | |
|---|---|---|---|---|
| CN | 210798431 | U | 6/2020 | |
| KR | 101504711 | B1 * | 3/2015 | E06B 11/08 |
| TW | I622549 | B | 5/2018 | |
| TW | I654363 | B | 3/2019 | |
| TW | I747066 | B | 11/2021 | |
| WO | WO-0077338 | A1 * | 12/2000 | E06B 11/08 |

* cited by examiner

ROTATION DEVICE FOR A TURNSTILE

CROSS-REFERENCE TO RELATED APPLICATION

This application claims priority to Taiwanese Invention Patent Application No. 111133913, filed on Sep. 7, 2022.

FIELD

The disclosure relates to a rotation device, and more particularly to a rotation device for a turnstile.

BACKGROUND

Turnstiles are widely used in mass transit stations and office lobbies. However, a conventional turnstile may not be equipped with various operation modes to meet the actual needs.

SUMMARY

Therefore, an object of the disclosure is to provide a rotation device that can alleviate the drawback of the prior art.

According to the disclosure, the rotation device includes a base seat, an axle unit, a lower rotating module and an upper rotating module. The axle unit includes an upper axle that extends into the base seat, and a lower axle that extends into the base seat and that is located below the upper axle. The lower rotating module includes a lock unit, and an outer barrel that is disposed in the base seat and that is penetrated by the lower axle. The lock unit includes a lock plate that is sleeved on the lower axle, and a lock member that is mounted to the base seat. The lock plate is formed with a first lock groove. The lock member has a lock portion that is operable to move into the first lock groove. The upper rotating module is disposed in the base seat and is co-rotatably sleeved on the upper axle. The upper rotating module is able to be driven by the upper axle to rotate relative to the lower rotating module.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
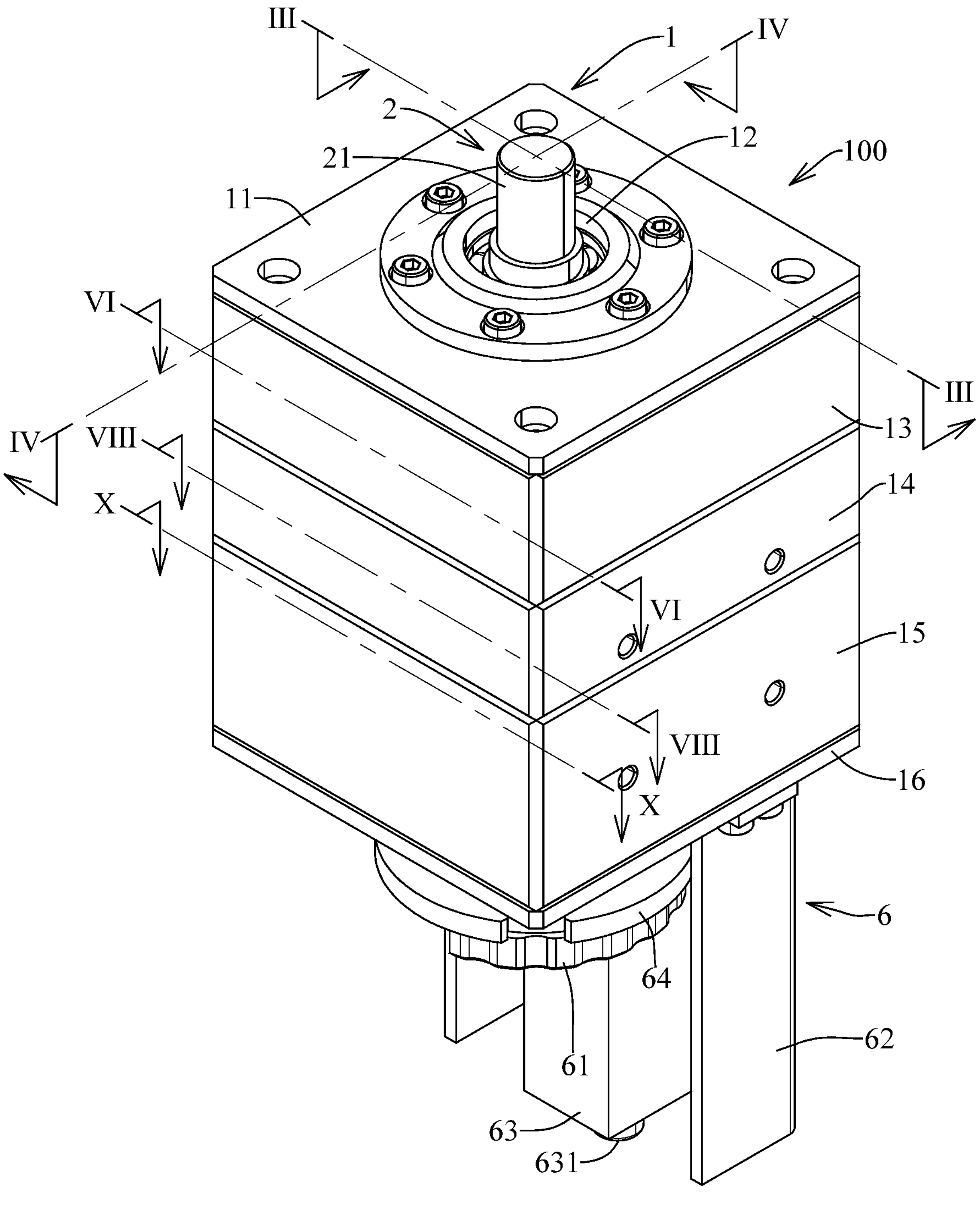
FIG. 1 is a perspective view illustrating a first embodiment of the rotation device according to the disclosure.
Figure 2:
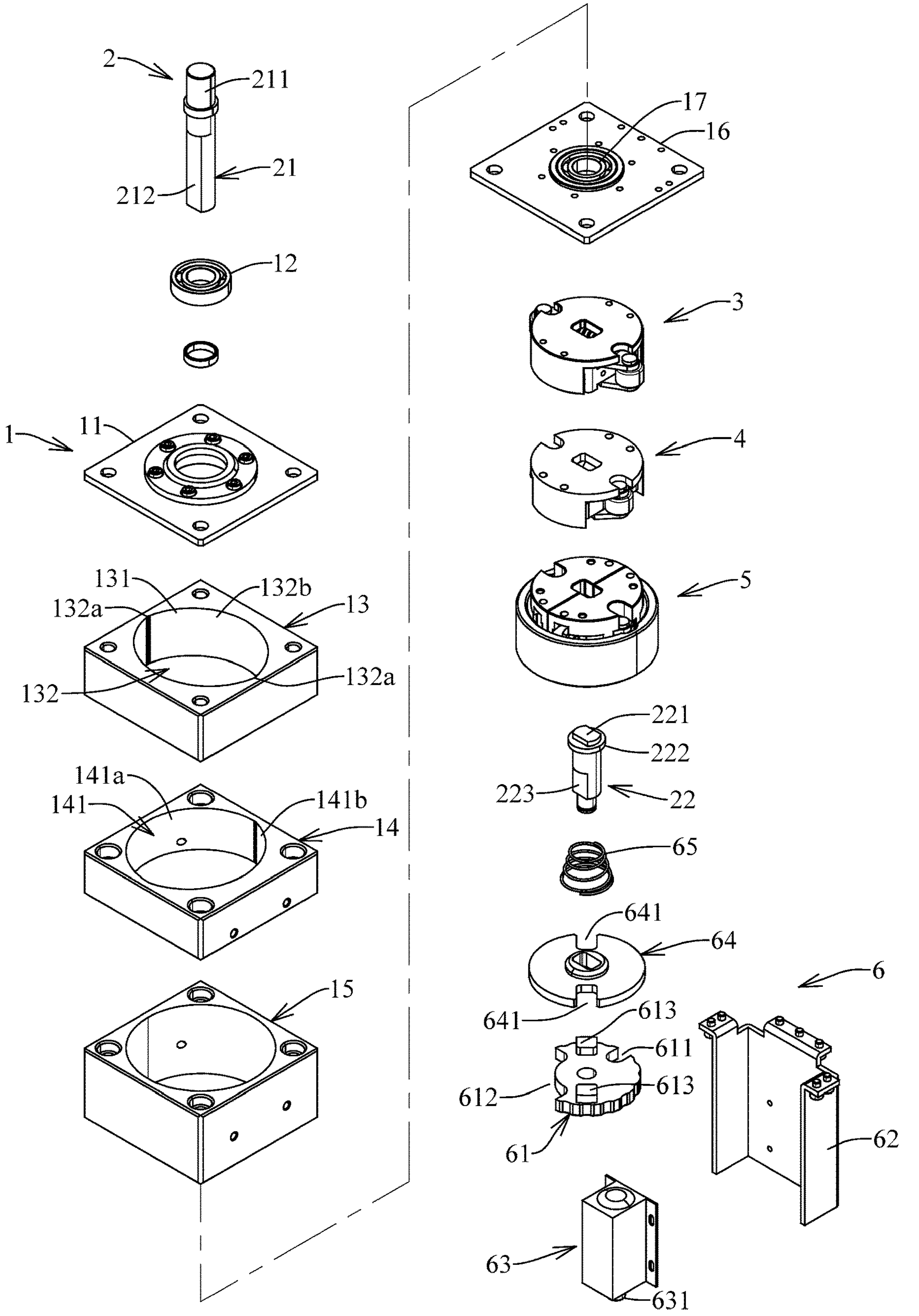
FIG. 2 is an exploded perspective view of the first embodiment.
Figure 3:
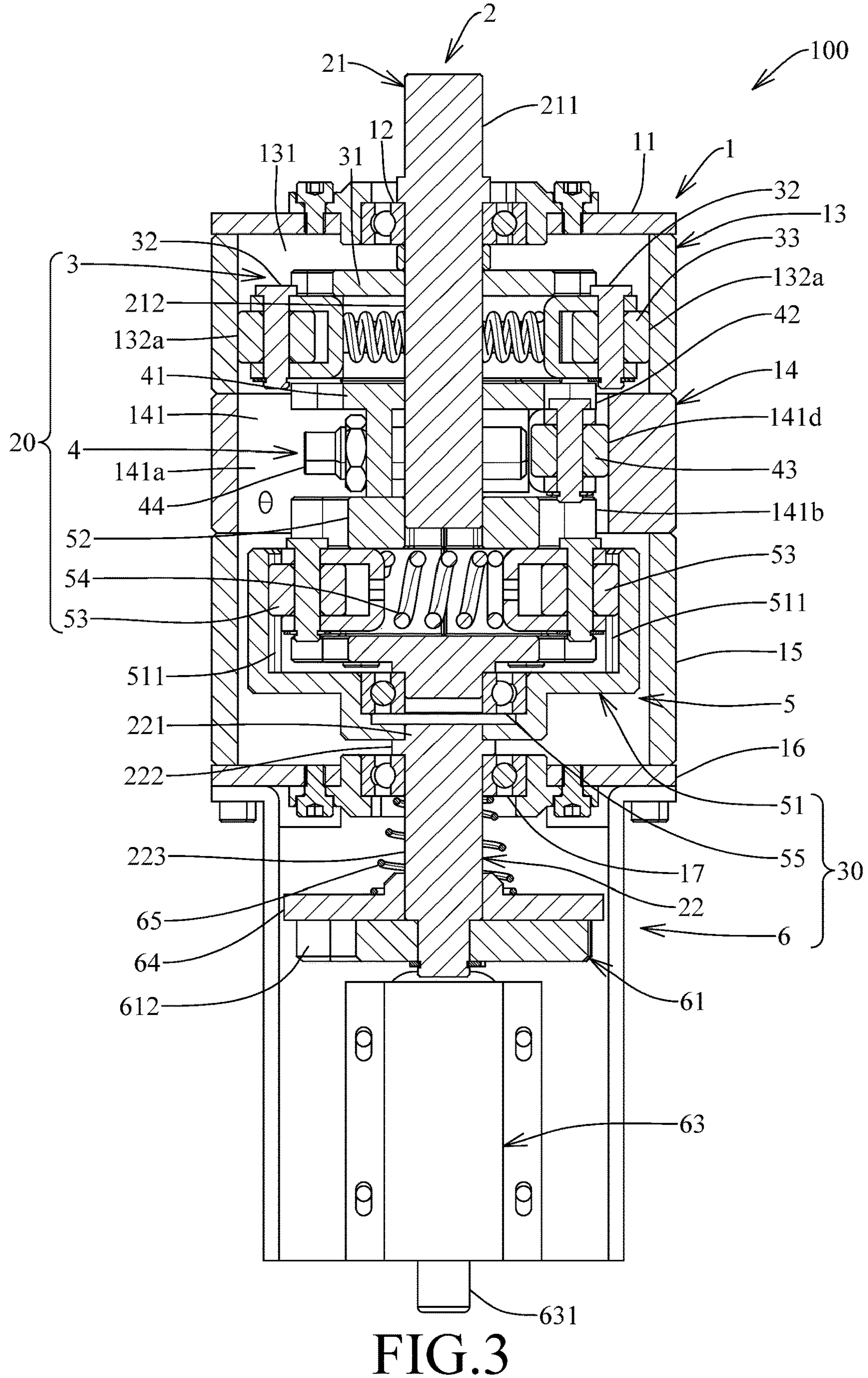
FIG. 3 is a sectional view taken along line III-Ill of FIG. 1.
Figure 4:
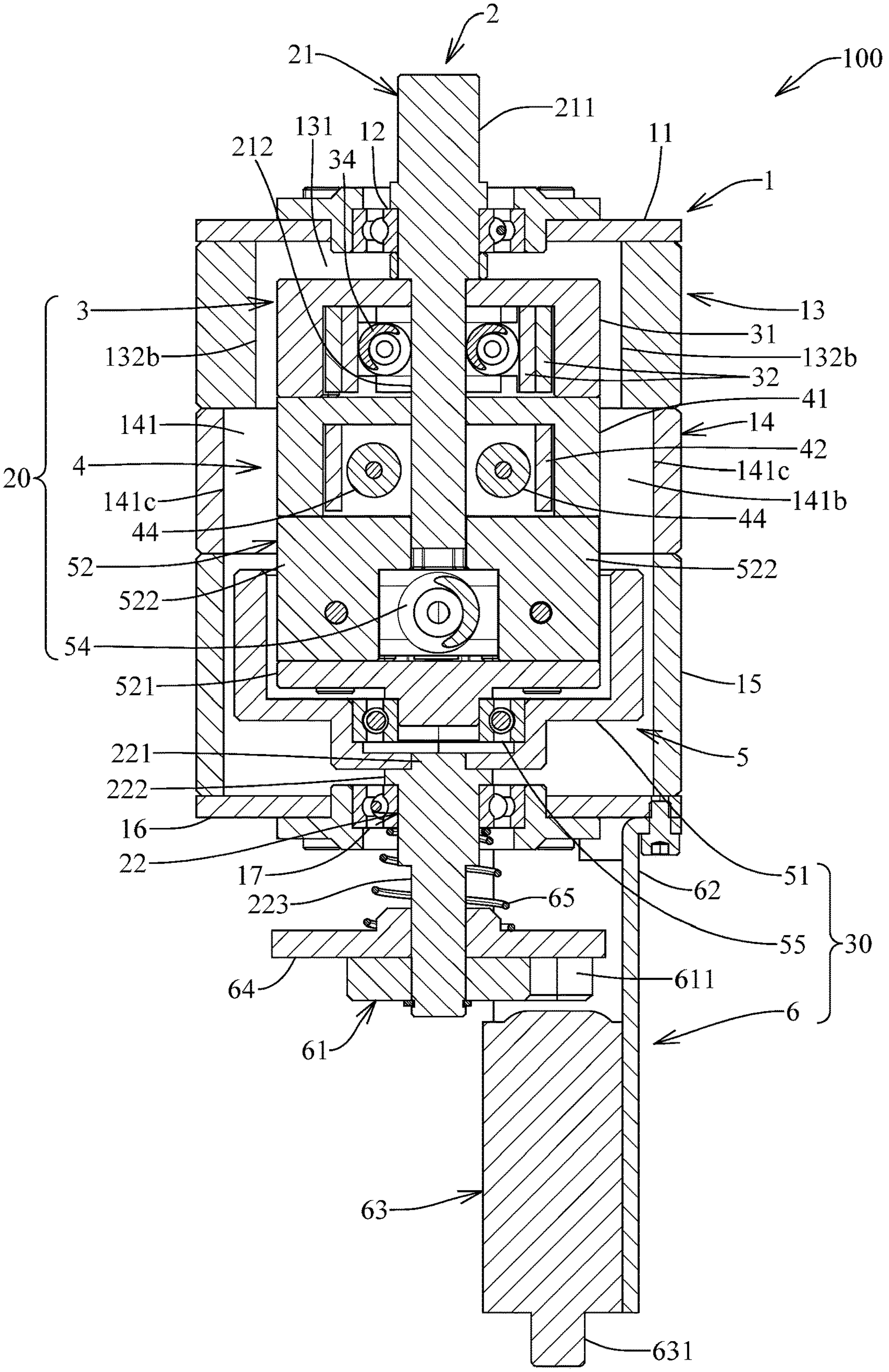
FIG. 4 is a sectional view taken along line IV-IV of FIG. 1.
Figure 5:
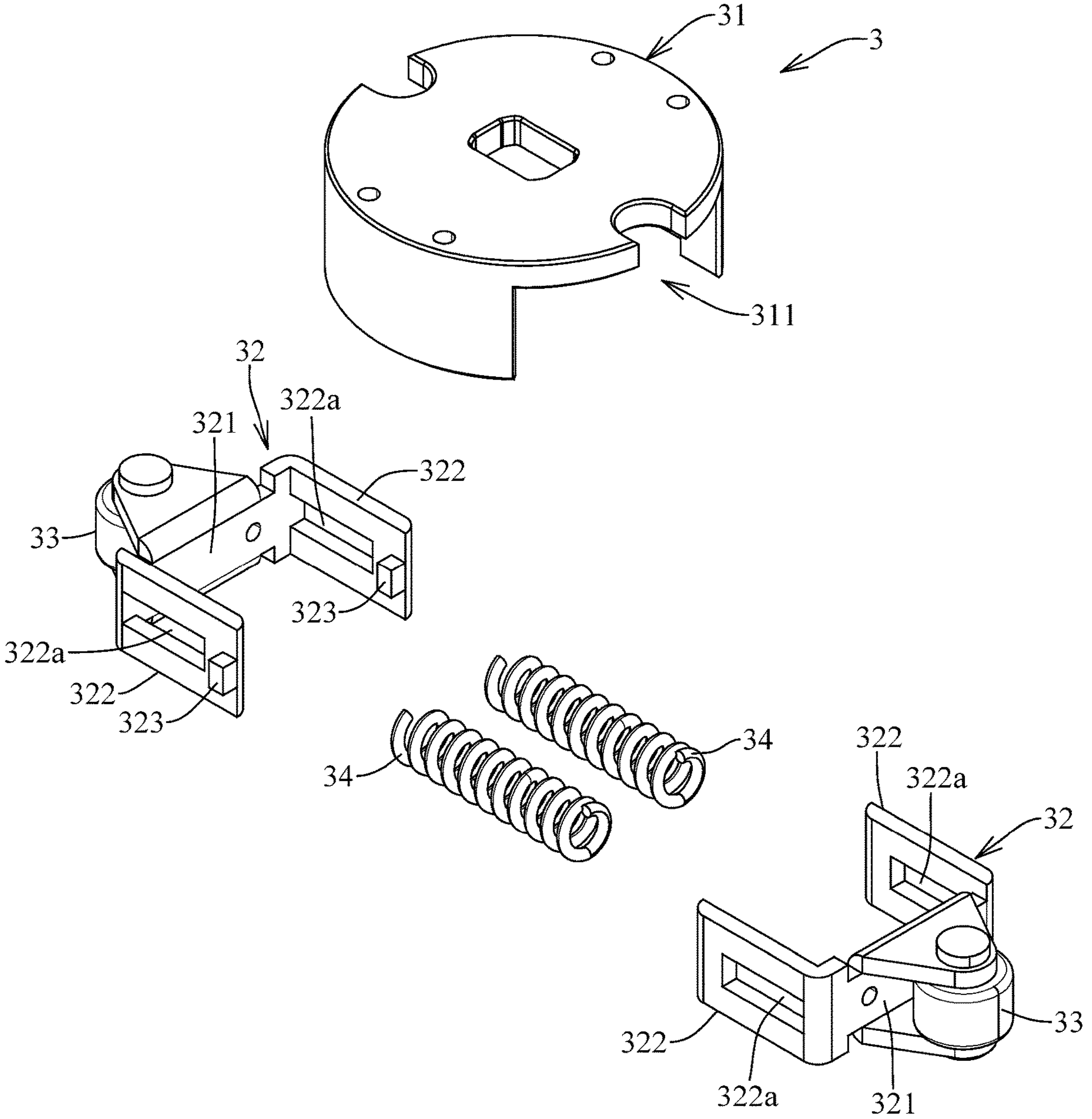
FIG. 5 is an exploded perspective view of a restoring unit of the first embodiment.
Figure 6:
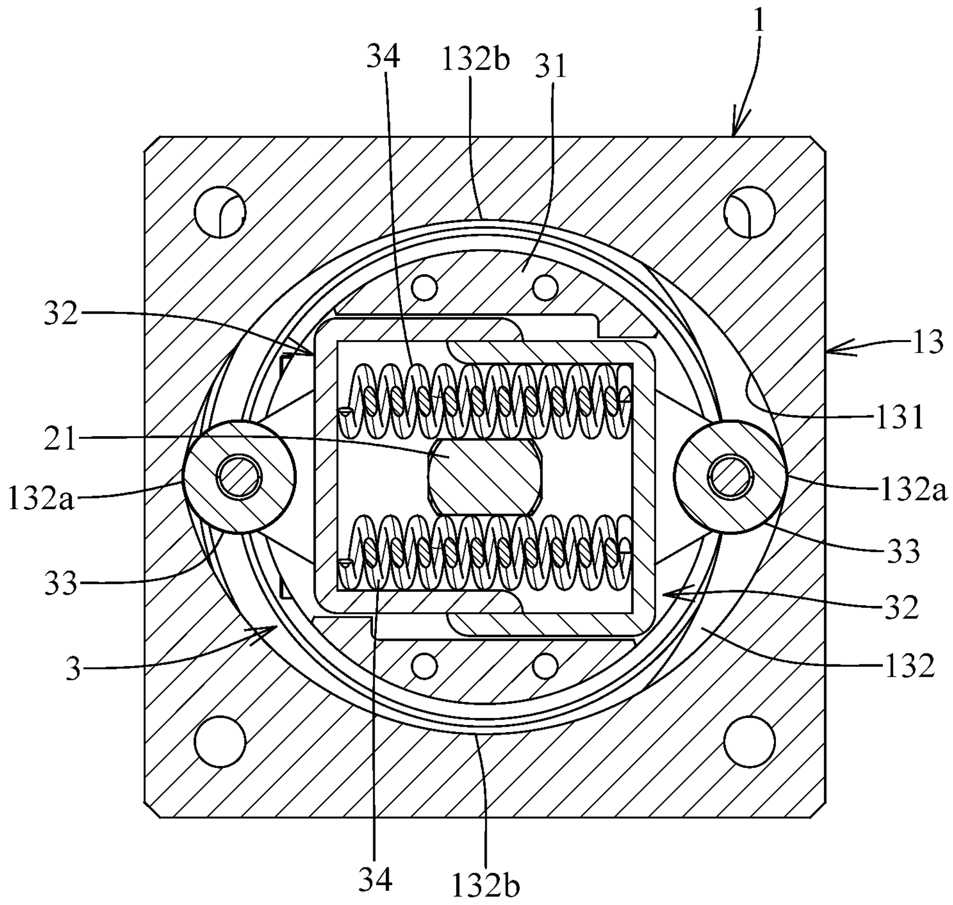
FIG. 6 is a sectional view taken along line VI-VI of FIG. 1.
Figure 7:
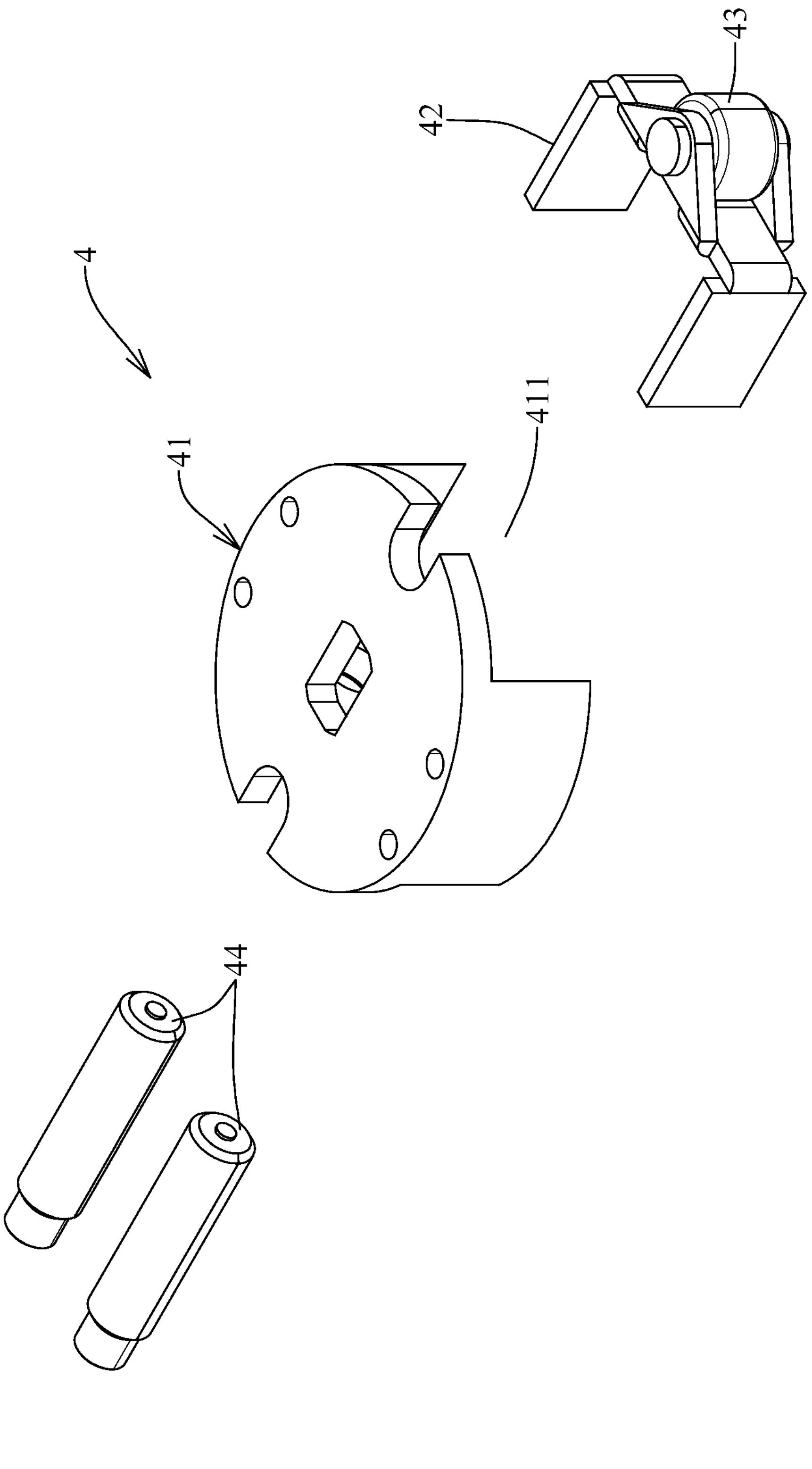
FIG. 7 is an exploded perspective view of a buffer unit of the first embodiment.
Figure 8:
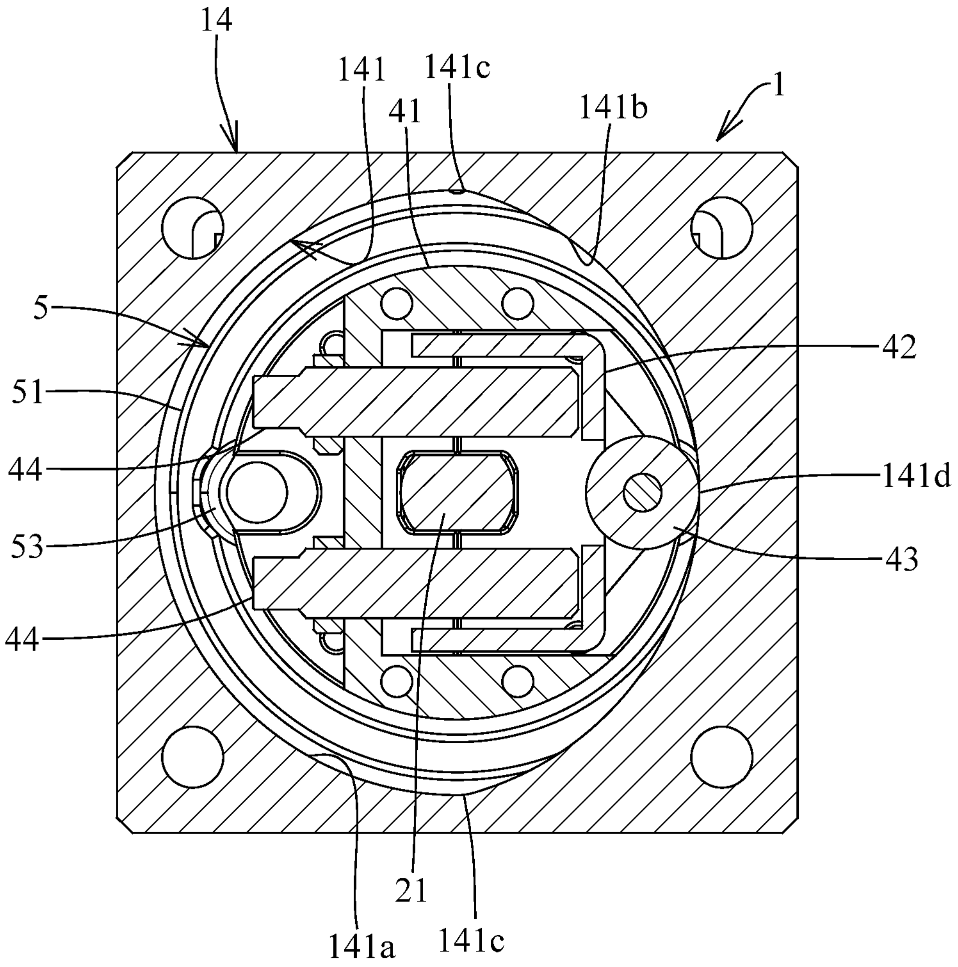
FIG. 8 is a sectional view taken along line VIII-VIII of FIG. 1.
Figure 9:
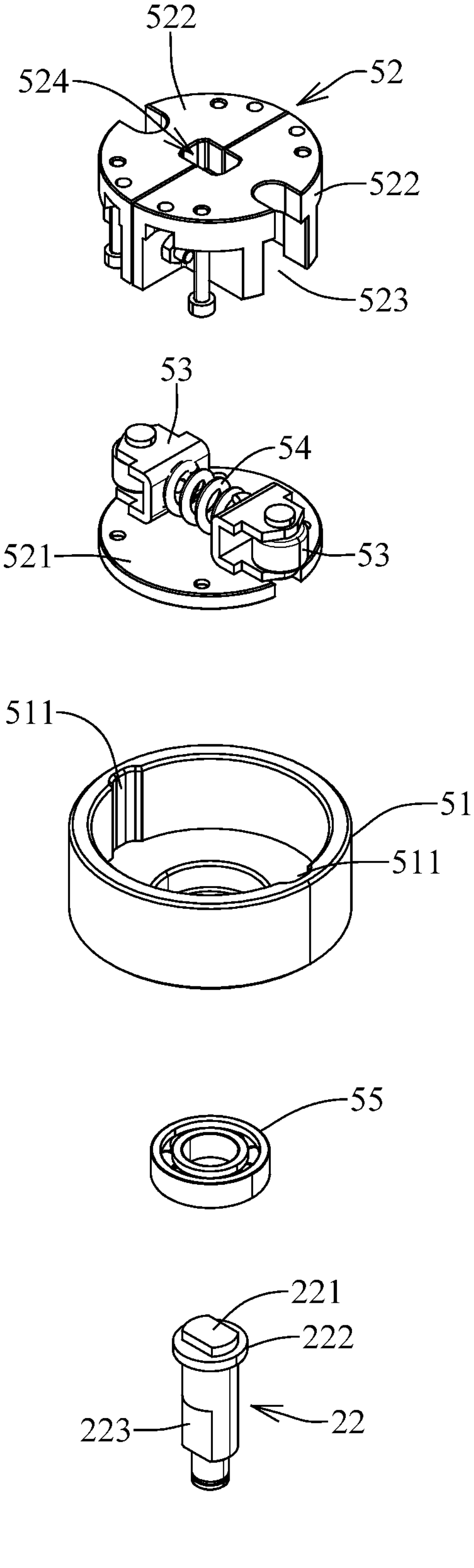
FIG. 9 is an exploded perspective view of an overload protection unit of the first embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 4, a first embodiment of the rotation device 100 according to the disclosure is to be used in a turnstile, and is connected to a barrier (not shown). The turnstile is manually operated. That is to say, an operator needs to manually push the barrier in order to pass the turnstile. The first embodiment of the rotation device 100 includes a base seat 1, an axle unit 2, a restoring unit 3, a buffer unit 4, an overload protection unit 5 and a lock unit 6.

Figure 10:
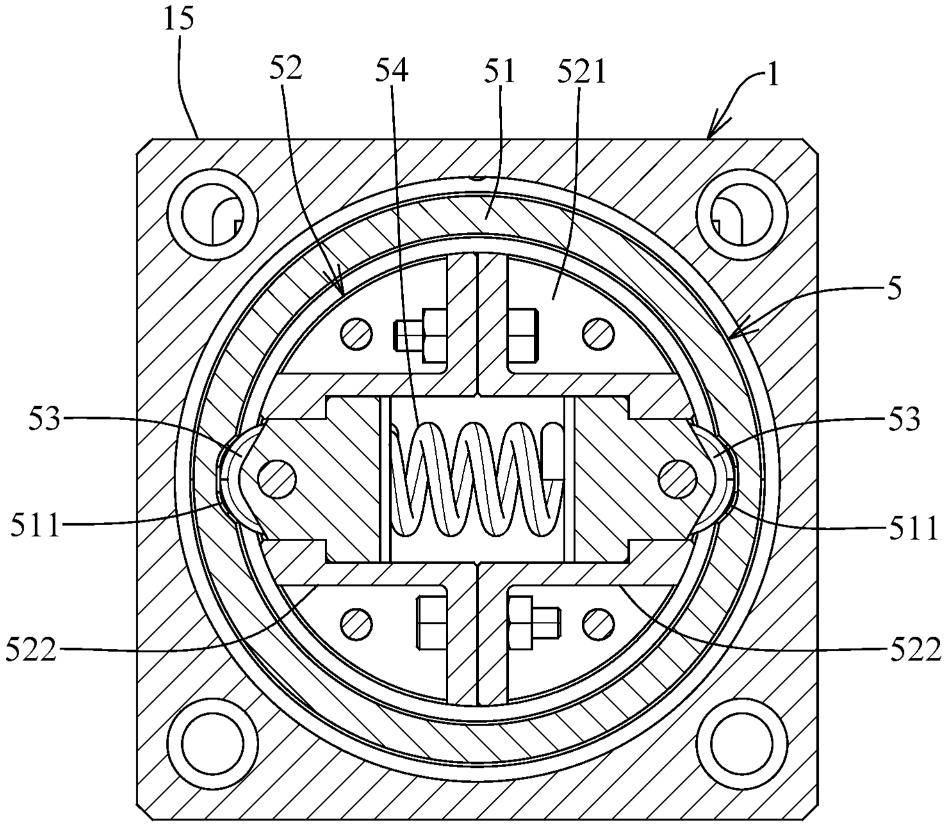
FIG. 10 is a sectional view taken along line X-X of FIG. 1.
Figure 11:
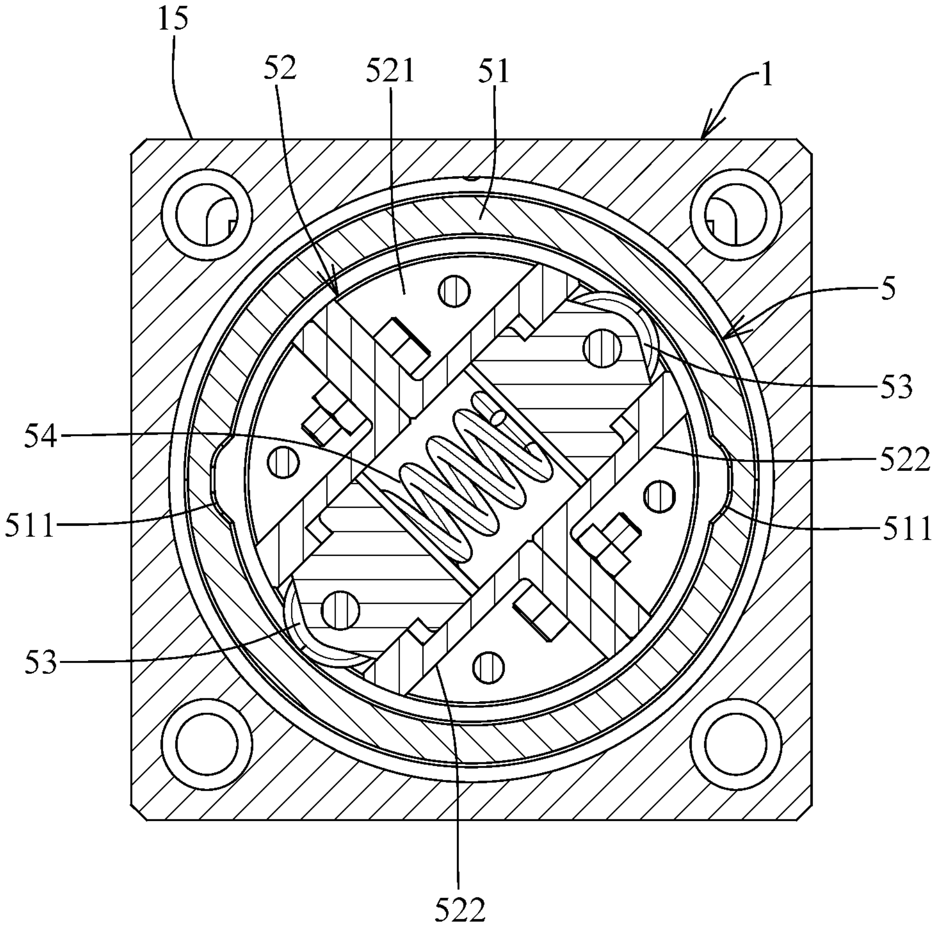
FIG. 11 is a sectional view similar to FIG. 10, illustrating operation of the overload protection unit.
Figure 12:
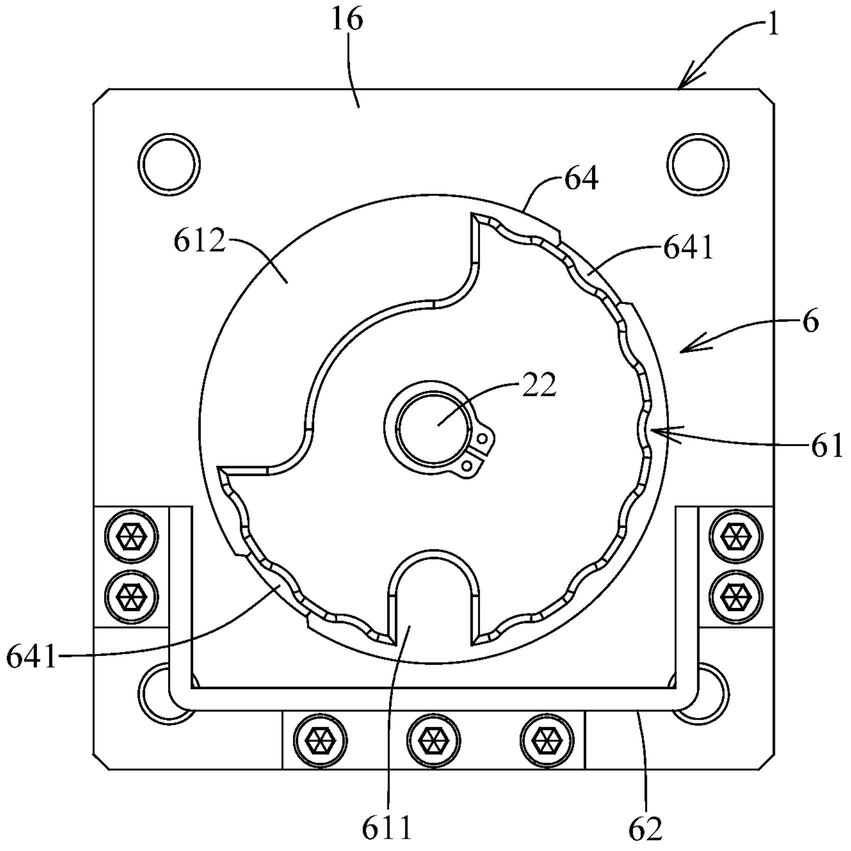
FIG. 12 is a schematic bottom view illustrating a lock plate of the first embodiment.

Referring further to FIGS. 5 to 8, the axle unit 2 includes an upper axle 21 that extends into the base seat 1, and a lower axle 22 that extends into the base seat 1 and that is located below the upper axle 21. The upper axle 21 has a connecting portion 211 that is connected to the barrier, and an extending portion 212 that is located below the connecting portion 211 and that extends into the base seat 1, the restoring unit 3 and the buffer unit 4. The base seat 1 includes a top plate 11, an upper bearing 12 that is disposed on a central portion of the top plate 11, a first casing 13 that is connected to the top plate 11 and that is located below the top casing 11, a second casing 14 that is connected to the first casing 13 and that is located below the first casing 13, a third casing 15 that is connected to the second casing 14 and that is located below the second casing 14, a bottom plate 16 that is connected to the third casing 15 and that is located below the third casing 15, and a lower bearing 17 that is disposed on the bottom plate 16. The first casing 13 accommodates the restoring unit 3, and has a first inner surface 131. The first inner surface 131 defines an elliptic first opening 132 (see FIG. 6) that extends in a top-bottom direction. The first opening 132 has two opposite major axial ends 132*a* and two opposite minor axial ends 132*b*. A distance between the major axial ends 132*a* is longer than that between the minor axial ends 132*b*. The second casing 14 accommodates the buffer unit 4, and has a second inner surface 141. The second inner surface 141 has a first half 141*a*, and a second half 141*b* connected to the first half 141*a* (see FIG. 8). The second half 141*b* is arc-shaped, has two opposite end portions 141*c* that are connected to the first half 141*a*, and has an intermediate portion 141*d* that is located between the end portions 141*c*. A distance between the intermediate portion 141*d* and the upper axle 21 is shorter than that between the upper axle 21 and either one of the end portions 141*c*. The third casing 15 accommodates the overload protection unit 5, and defines a circular opening (see FIG. 10) that extends in the top-bottom direction. In this embodiment, the upper bearing 12 and the lower bearing 17 are ball bearings, but are not limited to such.

Referring to FIGS. 3 to 6, the restoring unit 3 is for restoring the upper axle 21 to its original position after the upper axle 21 is rotated, and includes a restoring rotating bracket 31 that is co-rotatably connected to and penetrated by the upper axle 21, two restoring moving brackets 32 that are movably mounted to the restoring rotating bracket 31, two restoring abutment wheels 33 that are respectively mounted to the restoring moving brackets 32 and that abut against the first inner surface 131 of the first casing 13, and two restoring resilient members 34 that are disposed between the restoring moving brackets 32. The restoring rotating bracket 31 is formed with a restoring moving groove 311 that permits the restoring moving brackets 32 to be movably mounted thereto. Each of the restoring moving brackets 32 is substantially U-shaped, and has a mounting portion 321 that permits the respective one of the restoring abutment wheels 33 to be mounted thereto, two spaced-apart arm portions 322 that extend from the mounting portion 321, and two engaging blocks 323 each of which is formed at a distal end of a respective one of the arm portions 322. Each of the arm portions 322 is formed with an engaging groove 322*a*. The engaging blocks 323 of each of the restoring moving brackets 32 respectively and movably engage the engaging grooves 322*a* of the arm portions 322 of another one of the restoring moving brackets 32. Each of the restoring resilient members 34 has two opposite ends respectively abutting against the mounting portions 321 of the restoring moving brackets 32.

Referring to FIGS. 3, 4, 7 and 8, the buffer unit 4 is for damping the rotation of the upper axle 21 when the upper axle 21 rotates back to its original position. The buffer unit 4 includes a buffer rotating bracket 41 that is co-rotatably connected to and penetrated by the upper axle 21, a buffer moving bracket 42 that is movably mounted to the buffer rotating bracket 41, a buffer abutment wheel 43 that is mounted to the buffer moving bracket 42 and that abuts against the second half 141*b* of the second inner surface 141 of the second casing 14, and two cushion members 44 that are mounted to the buffer rotating bracket 41 and that abut against the buffer moving bracket 42. The buffer rotating bracket 41 is formed with a buffer moving groove 411 that permits the buffer moving brackets 42 to be movably mounted thereto.

Referring to FIGS. 3, 4, 9 and 10, the overload protection unit 5 includes an outer barrel 51 that is disposed in the base seat 1 and that is penetrated by the lower axle 22, an overload rotating bracket 52 that is received in the outer barrel 51 and that is penetrated by the upper axle 21, and an overload bearing 55 that is mounted to a bottom of the outer barrel 51. The overload rotating bracket 52 includes a base plate 521, two semicircular half brackets 522 that are mounted to the base plate 521, an overload moving groove 523 that is cooperatively defined by the base plate 521 and the half brackets 522, two overload abutment wheel assemblies 53 that are disposed in the overload moving groove 523, and an overload resilient member 54 that is disposed in the overload moving groove 523 and that is located between the overload abutment wheel assemblies 53. An inner surface of the outer barrel 51 is formed with two engaging grooves 511. The overload abutment wheel assemblies 53 are able to respectively engage the engaging grooves 511 of the outer barrel 51. The half brackets 522 cooperatively define an overload opening 524 that permits the upper axle 21 to extend therethrough such that the overload rotating bracket 52 and the upper axle 21 are co-rotatable. The lower axle 22 has a coupling portion 221 that extends into the bottom of the outer barrel 51, an abutment portion 222 that is connected to a bottom of the coupling portion 221 and that abuts against the lower bearing 17, and an extending portion 223 that extends into the lock unit 6.

Figure 13:
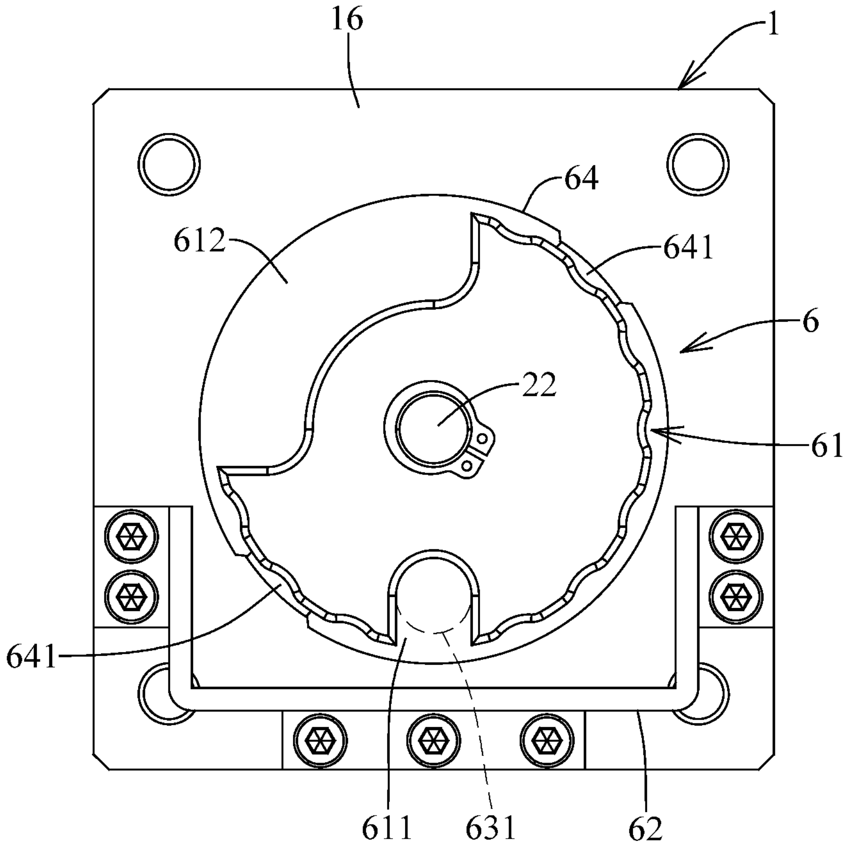
FIG. 13 is a schematic bottom view illustrating operation of the lock plate.
Figure 14:
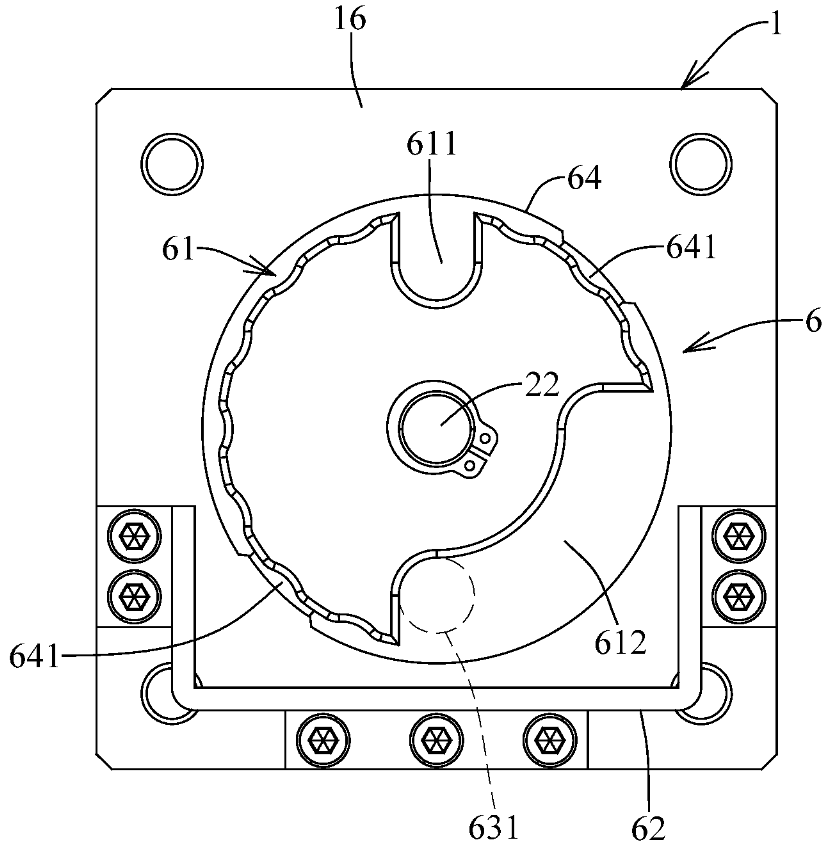
FIG. 14 is another schematic bottom view illustrating the operation of the lock plate.
Figure 15:
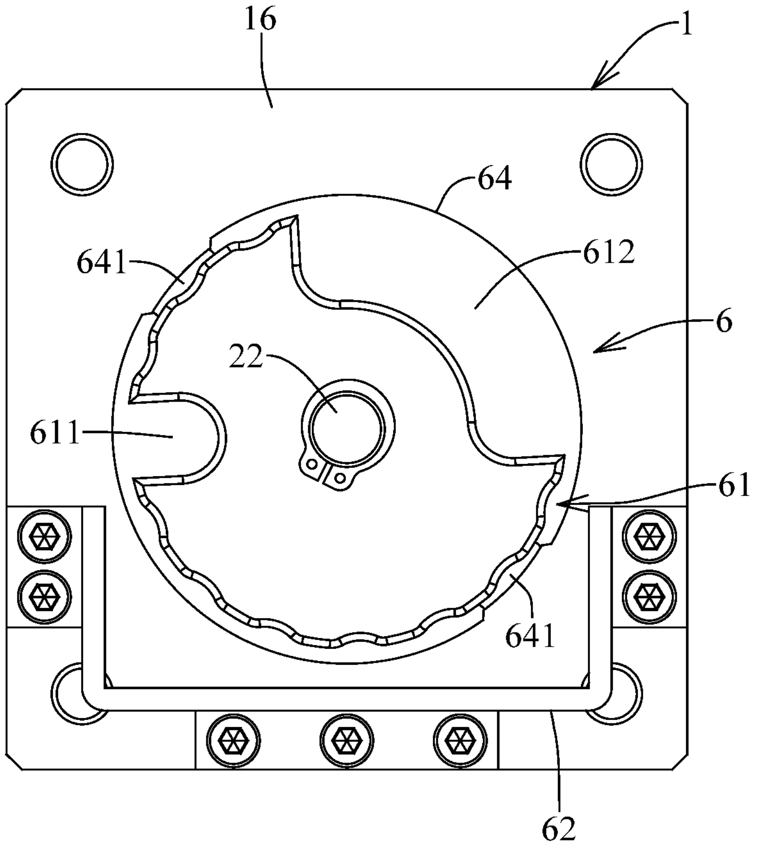
FIG. 15 is still another schematic bottom view illustrating the operation of the lock plate.
Figure 16:
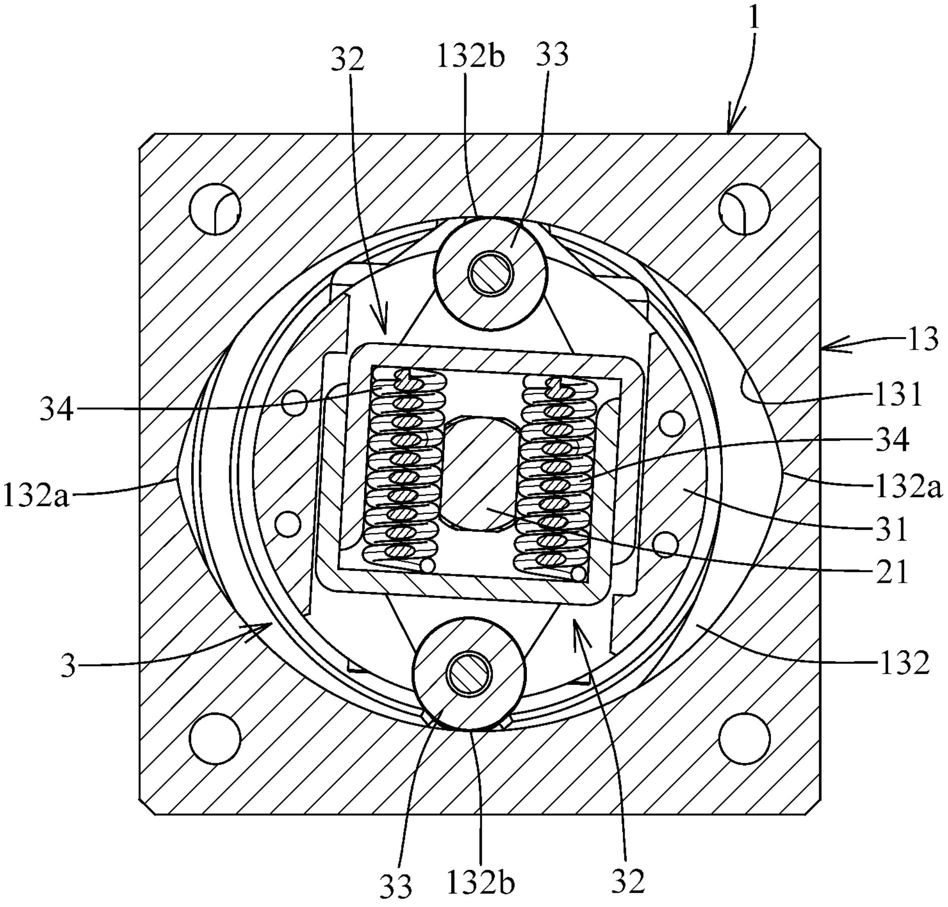
FIG. 16 is a schematic section view illustrating operation of the restoring unit.
Figure 17:
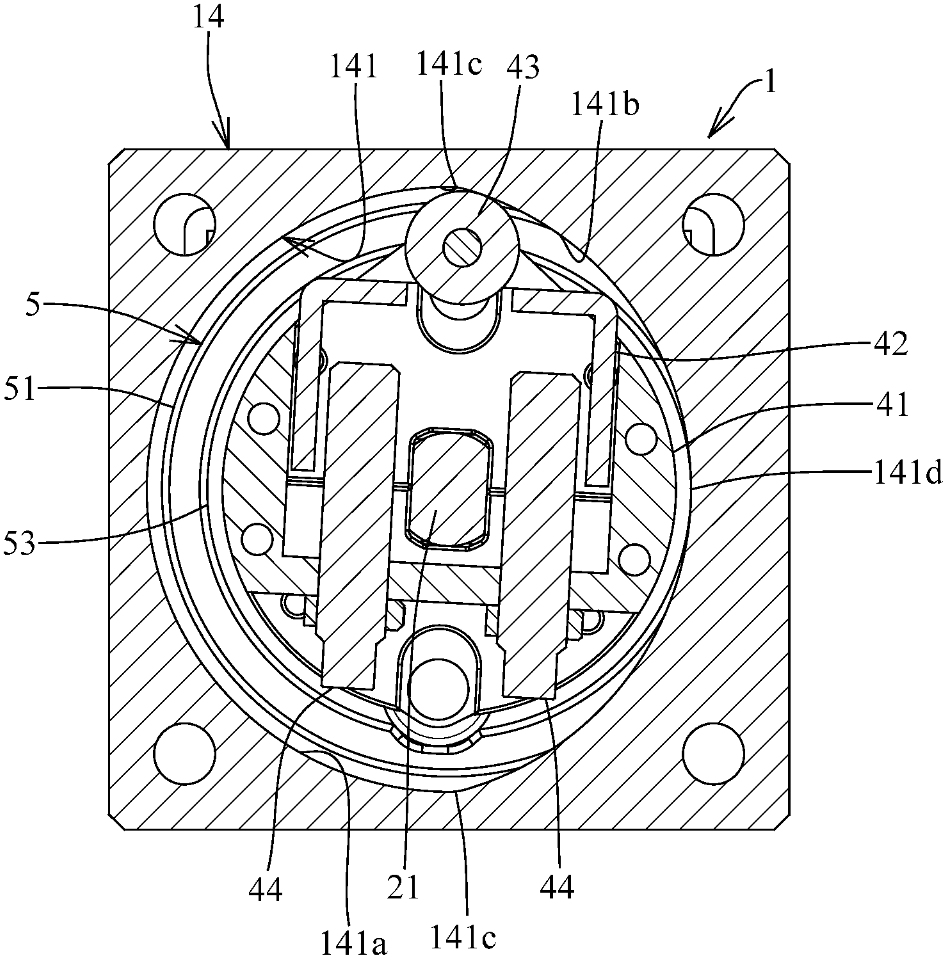
FIG. 17 is a schematic section view illustrating operation of the buffer unit.
Figure 18:
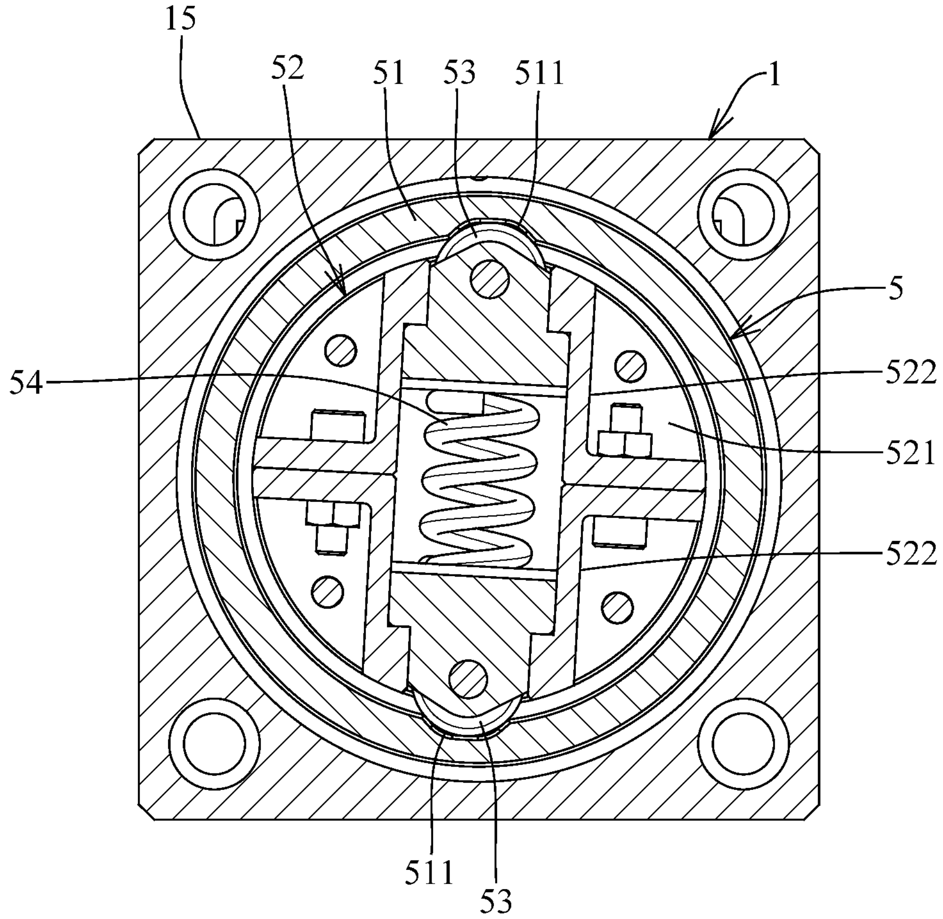
FIG. 18 is a schematic section view illustrating operation of the overload protection unit.
Figure 19:
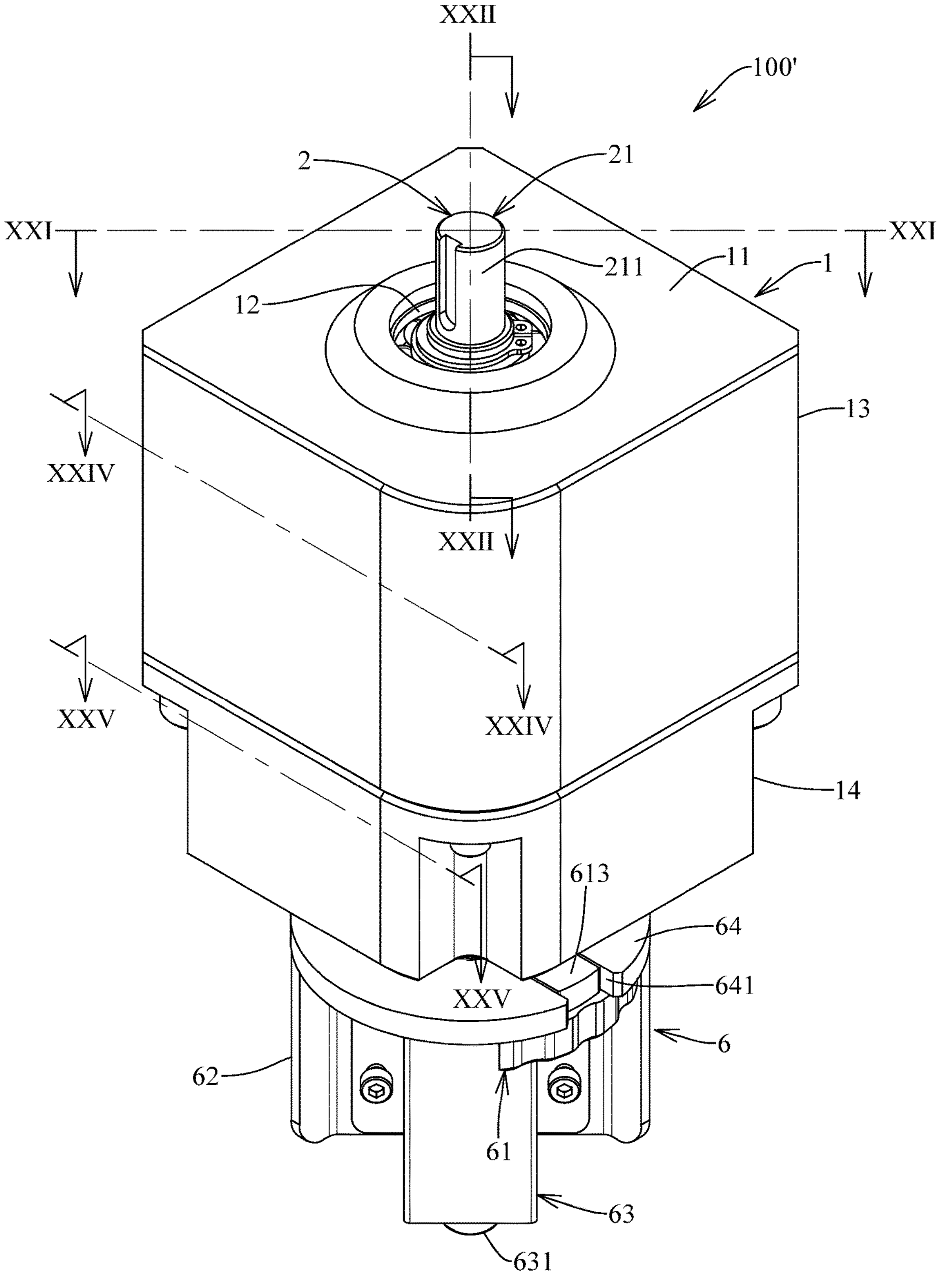
FIG. 19 is a perspective view illustrating a second embodiment of the rotation device according to the disclosure.

Referring to FIGS. 2, 4, 12 and 14, the lock unit 6 includes a lock plate 61 that is sleeved on the extending portion 223 of the lower axle 22, a mounting casing 62 that is mounted to the base seat 1, a lock member 63 that is mounted to the mounting casing 62, a switch plate 64 that is located above the lock plate 61 and that is slidably sleeved on the lower axle 22, and a switch resilient member 65 that is located between the switch plate 64 and the bottom plate 16 of the base seat 1. The lock plate 61 is formed with a first lock groove 611, a second lock groove 612 that is angularly spaced apart from the first lock groove 611, and two protruding blocks 613 that protrude upwardly. The second lock groove 612 is in the form of a quarter circular arc. In this embodiment, the lock member 63 is an electromagnetic lock, and has a lock portion. The lock portion has a lock tongue 631 that is movable in the top-bottom direction. The switch plate 64 is formed with two engaging grooves 641 for the protruding blocks 613 to engage therewith. The lock plate 61 is operable to rotate relative to the lower axle 22 so as to align a selected one of the first lock groove 611 and the second lock groove 612 with the lock tongue 631 of the lock member 63 in the top-bottom direction. Each of the protruding blocks 613 of the lock plate 61 is operable to engage a selected one of the engaging grooves 641 of the switch plate 64 for preventing relative rotation between the lock plate 61 and the switch plate 64. In this embodiment, the lock member 63 is configured as a fail-safe electromagnetic lock. That is to say, when the lock member 63 is energized, the lock tongue 631 moves upwardly into the selected one of the first lock groove 611 and the second lock groove 612. Referring to FIG. 13, when the lock member 63 is energized, the lock tongue 631 moves upwardly into the first lock groove 611 such that the lock plate 61, the switch plate 64 and the lower axle 22 are prevented from rotation by the lock tongue 631. To switch the rotation device 100, the lock plate 61 may be rotated by 180 degrees after the switch plate 64 is manually moved upwardly to separate the engaging grooves 641 from the protruding blocks 613 of the lock plate 61 and to compress the switch resilient member 65, so as to align the second lock groove 612 with the lock tongue 631 of the lock member 63 in the top-bottom direction, and the switch plate 64 is then released such that the switch resilient member 65 pushes the switch plate 64 to respectively engage the engaging grooves 641 with the protruding blocks 613 so as to prevent the relative rotation between the lock plate 61 and the switch plate 64. When the lock member 63 is energized after the abovementioned switch operation, the lock tongue 631 moves upwardly into the second lock groove 612. Because the second lock groove 612 is in the form of a quarter circular arc, the lock plate 61, the switch plate 64 and the lower axle 22 are not prevented from rotation by the lock tongue 631, and are rotatable in at least one rotational direction. Since the lock member 63 is configured as a fail-safe electromagnetic lock, when a supply of electric power ceases, the axle unit 1 is rotatable relative to the base seat 1, so that the barrier may be pushed to permit passage through the turnstile. It is noted that the lock plate 61 is rotatable relative to the lower axle 22 but is not slidable along the lower axle 22. The switch plate 64 is slidable along the lower axle 22 but is not rotatable relative to the lower axle 22. The restoring unit 3 cooperates with the buffer unit 4 and the overload rotating bracket 52 of the overload protection unit 5 to form an upper rotating module 20. The outer barrel 51 of the overload protection unit 5 cooperates with the overload bearing 55, the lock plate 61, the switch plate 64 and the switch resilient member 65 to form a lower rotating module 30. The upper rotating module 20 is able to be driven by the upper axle 21 to rotate relative to the lower rotating module 30.

The rotation device 100 according to the disclosure is operable to switch among a closing state, a locking state and an opening state. Referring to FIGS. 6, 8, 10 and 12, when the rotation device 100 is in the closing state, the barrier (not shown) is not pushed, and blocks a gateway of the turnstile, and the upper axle 21, the restoring unit 3, the buffer unit 4 and the overload protection unit 5 are not rotated. At this time, the lock member 63 of the lock unit 6 is not energized, so that the lock tongue 631 of the lock member 63 is not moved into the first lock groove 611 and that rotation of the lock plate 61, the switch plate 64 and the lower axle 22 is not prevented. A user is able to directly push the barrier to pass the gateway in both directions (entrance and exit). When the rotation device 100 is in the locking state, the barrier is not pushed, and blocks the gateway, and the upper axle 21, the restoring unit 3, the buffer unit 4 and the overload protection unit 5 are not rotated. At this time, the lock member 63 of the lock unit 6 is energized, so that the lock tongue 631 of the lock member 63 moves into the first lock groove 611 and that rotation of the lock plate 61, the switch plate 64 and the lower axle 22 is prevented. The user is unable to pass the gateway. If the lock plate 61 is operated to align the second lock groove 612 with the lock tongue 631 in the top-bottom direction, when the rotation device is in the locking state (i.e., the lock tongue 631 moves into the second lock groove 612), the rotation of the lock plate 61, the switch plate 64 and the lower axle 22 in a rotational direction is still permitted since the second lock groove 612 is in the form of a quarter circular arc, and the user is able to pass the gateway in one direction (entrance or exit). The user may use an access card that may be identified by the turnstile to switch the rotation device 100 from the locking state to the closing state. When the barrier is pushed and rotated to permit entrance or exit via the gateway, the rotation device 100 is switched to the opening state. Referring to FIGS. 15 to 18, when the rotation device 100 is in the opening state, the upper axle 21, the restoring unit 3, the buffer unit 4, the overload protection unit 5, the lock plate 61, the switch plate 64 and the lower axle 22 are rotated by approximately 90 degrees. The restoring abutment wheels 33 of the restoring unit 3 move from the major axial ends **132*a* to the minor axial ends 132*b*, so the restoring moving brackets 32 are pushed by the first inner surface 131 of the first casing 13 to approach each other and to compress the restoring resilient members 34. After the barrier is released, a restoring force generated by the restoring resilient members 34 pushes the restoring moving brackets 32 away from each other, so as to rotate the upper axle 21, the restoring unit 3, the buffer unit 4, the overload protection unit 5, the lock plate 61, the switch plate 64 and the lower axle 22 back to their original positions (i.e., to switch the rotation device 100 to the closing state). The cushion members 44 are compressed when the buffer abutment wheel 43 of the buffer unit 4 abuts against the intermediate portion 141*d* of the second inner surface 141. During the switching of the rotation device 100 from the closing state to the opening state, the buffer abutment wheel 43 of the buffer unit 4 moves from the intermediate portion 141*d* of the second inner surface 141 to one of the end portions 141*c*, and the cushion members 44 are switched from a compressed state to an uncompressed state. During the switching of the rotation device 100 from the opening state to the closing state, the cushion members 44 are compressed to damp the rotation of the upper axle 21, the restoring unit 3, the buffer unit 4, the overload protection unit 5, the lock plate 61, the switch plate 64 and the lower axle 22 back to their original positions. As such, after the user passes the gateway, the barrier may automatically rotate back to its original position, and a rotational speed of the barrier is relatively slow so as to prevent a next user from being injured by the barrier. It should be noted that, when the rotation device 100 is in the locking state, if a force pushing the barrier exceeds a predetermined value, the overload abutment wheel assemblies 53 are able to respectively disengage from engaging grooves 511 of the outer barrel 51 against the biasing action of the overload resilient member 54 and move along the inner surface of the outer barrel 51 so that the upper rotating module 20 is driven by the upper axle 21 to rotate relative to the lower rotating module 30. By such operation, a force between the lock plate 61 and the lock tongue 631 of the lock member 63 resulting from the rotation of the barrier is limited within a predetermined range so as to prevent damage to the lock plate 61 and the lock tongue 631**.

It is noted that, the number of the restoring moving brackets 32, the restoring abutment wheels 33 or the restoring resilient members 34 is not limited to two. In other modifications, the number of the restoring moving brackets 32, the restoring abutment wheels 33 or the restoring resilient members 34 may be one. In a modification that includes only one restoring moving bracket 32, the restoring resilient member 34 has an end abutting against the mounting portion 321 of the restoring moving bracket 32, and an opposite end abutting against the restoring rotating bracket 31, and the first inner surface 131 of the first casing 13 may have only one major axial end 132*a* and one minor axial end 132*b*. The abovementioned configuration may also drive the upper axle 21, the restoring unit 3, the buffer unit 4, the overload protection unit 5, the lock plate 61, the switch plate 64 and the lower axle 22 to rotate back to their original positions after the barrier is released.

Referring to FIGS. 19 to 22, a second embodiment of the rotation device 100' according to the disclosure is similar to the first embodiment. The second embodiment of the rotation device 100' includes a base seat 1, an axle unit 2, a restoring unit 3, a buffer unit 4 and a lock unit 6. The overload protection unit of the first embodiment is omitted.

In the second embodiment, the base seat 1 includes a first casing 13 and a second casing 14. The third casing 15 of the first embodiment is omitted. The axle unit 2 includes an upper axle 21. The lower axle of the first embodiment is omitted. The upper axle 21 extends into the base seat 1, the restoring unit 3, the buffer unit 4, and the lock plate 61 and the switch plate 64 of the lock unit 6. The first casing 13 has a first inner surface 131, and a protruding column 133 that is formed on the first inner surface 131 and that extends in the top-bottom direction. The second casing 14 has a second inner surface 141. The second inner surface 141 has a first half 141*a*, and a second half 141*b* connected to the first half 141*a*. The second half 141*b* has two opposite end portions 141*c* that are connected to the first half 141*a*, an intermediate portion 141*d* that is located between the end portions 141*c*, two circular arc sections 141*b*1 that respectively extend from the end portions 141*c* toward the intermediate portion 141*d*, and a flat section 141*b*2 that is connected between the circular arc sections 141*b*1. The flat section 141*b*2 is formed with a recess 141*b*3 that is located at the intermediate portion 141*d*. A distance between the intermediate portion 141*d* and the upper axle 21 is shorter than that between the upper axle 21 and either one of the end portions 141*c*.

Referring to FIGS. 21 to 24 and FIG. 30, the restoring unit 3 of the second embodiment includes two clamping plates 35, a tube member 36 that has two opposite ends respectively connected to the clamping plates 35, a rotating column 37 that has two opposite ends respectively connected to the clamping plates 35 and that is spaced apart from the tube member 36, and a torsion spring 38 that is rotatably sleeved on the tube member 36 and that has two opposite leg portions. The upper axle 21 co-rotatably extends through the clamping plates 35 and extends through the tube member 36. One of the leg portions of the torsion spring 38 abuts against one side of the protruding column 133 and one side of the rotating column 37. The other one of the leg portions of the torsion spring 38 abuts against an opposite side of the protruding column 133 and an opposite side of the rotating column 37. When the rotation device 100' is switched from the closing state to the opening state (i.e., the barrier is pushed), the restoring unit 3 is rotated by the upper axle 21, and the rotating column 37 urges one of the leg portions of the torsion spring 38 to rotate so as to deform the torsion spring 38. After the barrier is released, the torsion spring 38 restores to rotate the restoring unit 3 and the upper axle 21 back to their original positions.

Figure 20:
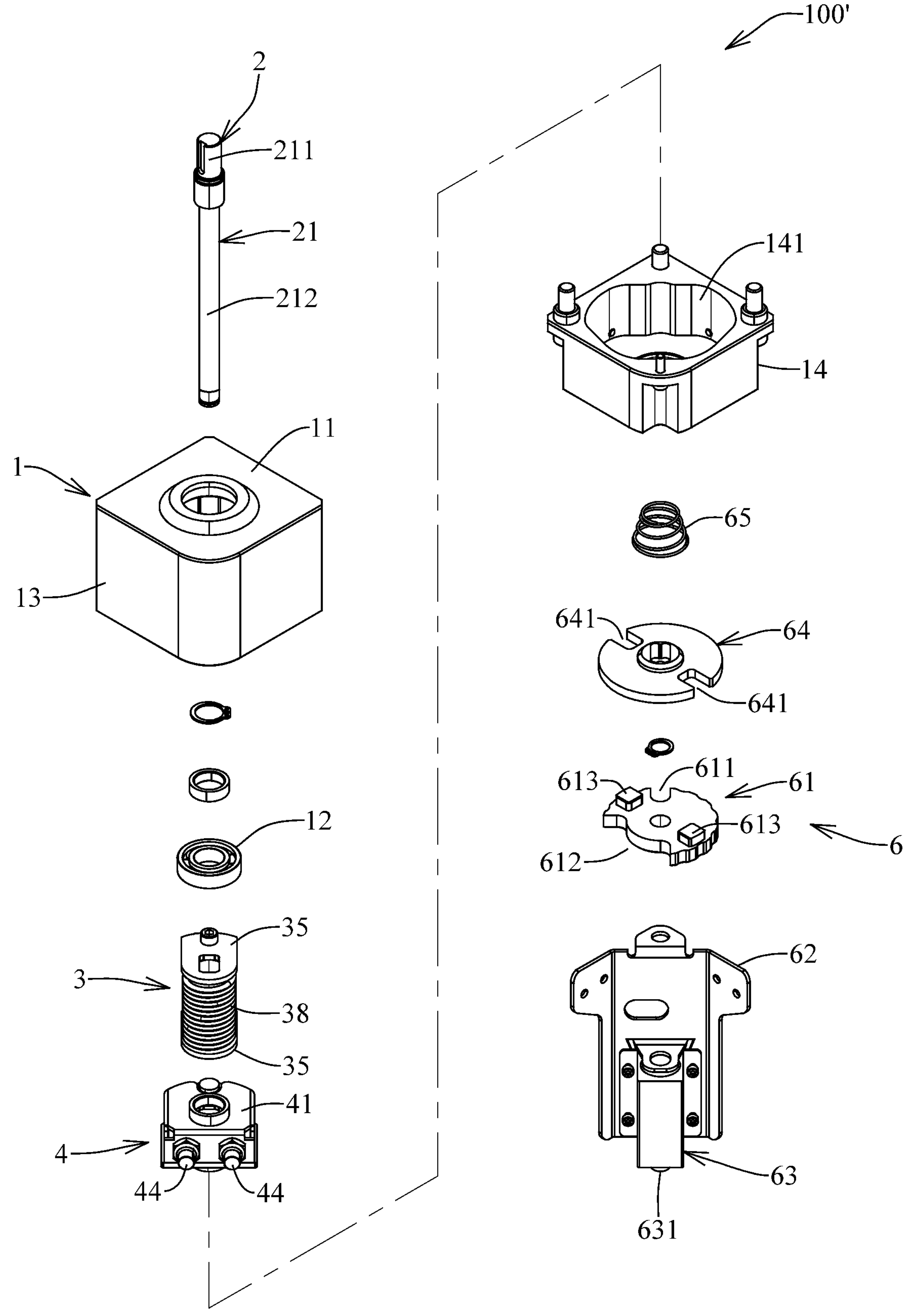
FIG. 20 is an exploded perspective view of the second embodiment.
Figure 21:
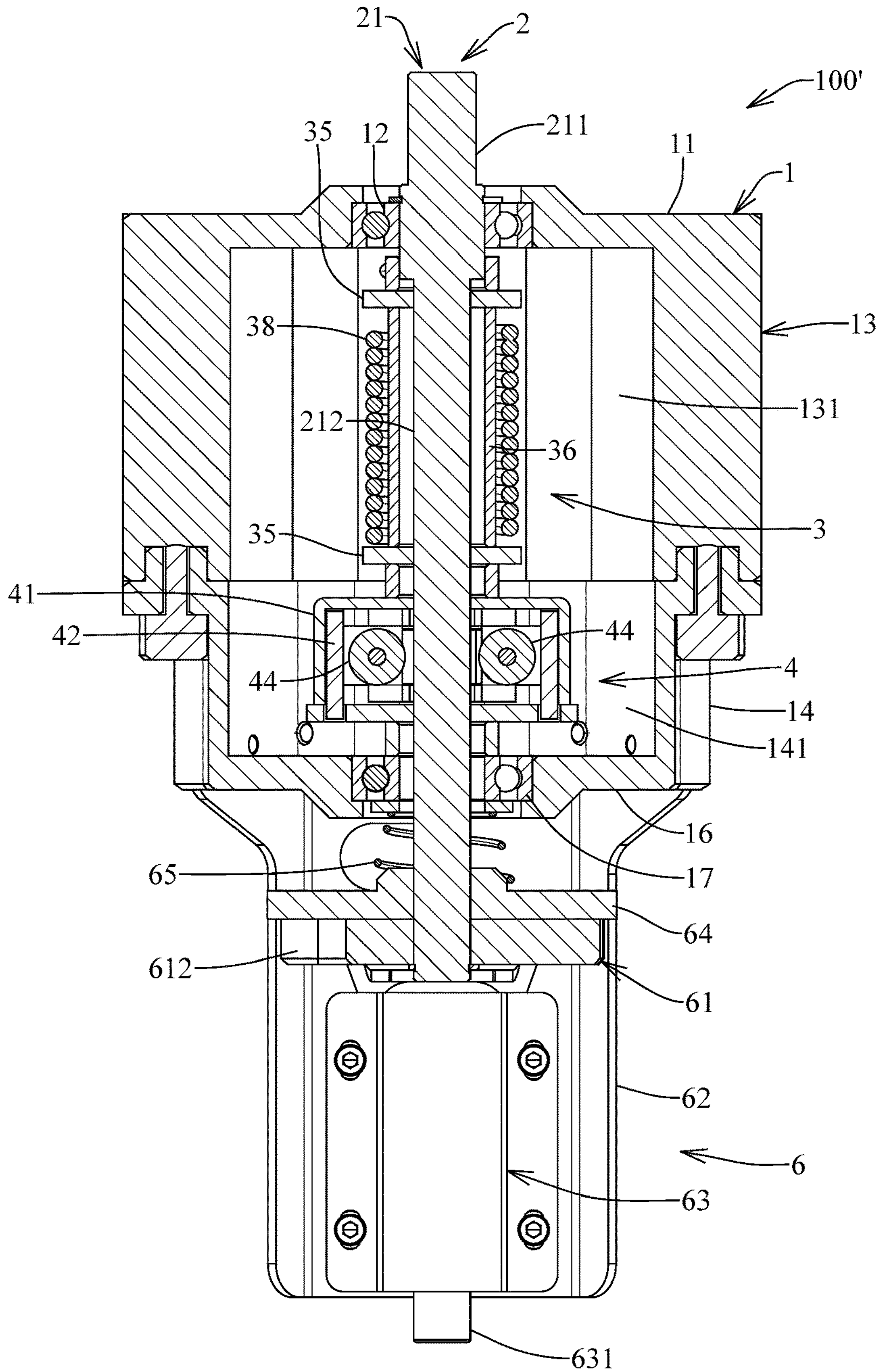
FIG. 21 is a sectional view taken along line XXI-XXI of FIG. 19.
Figure 22:
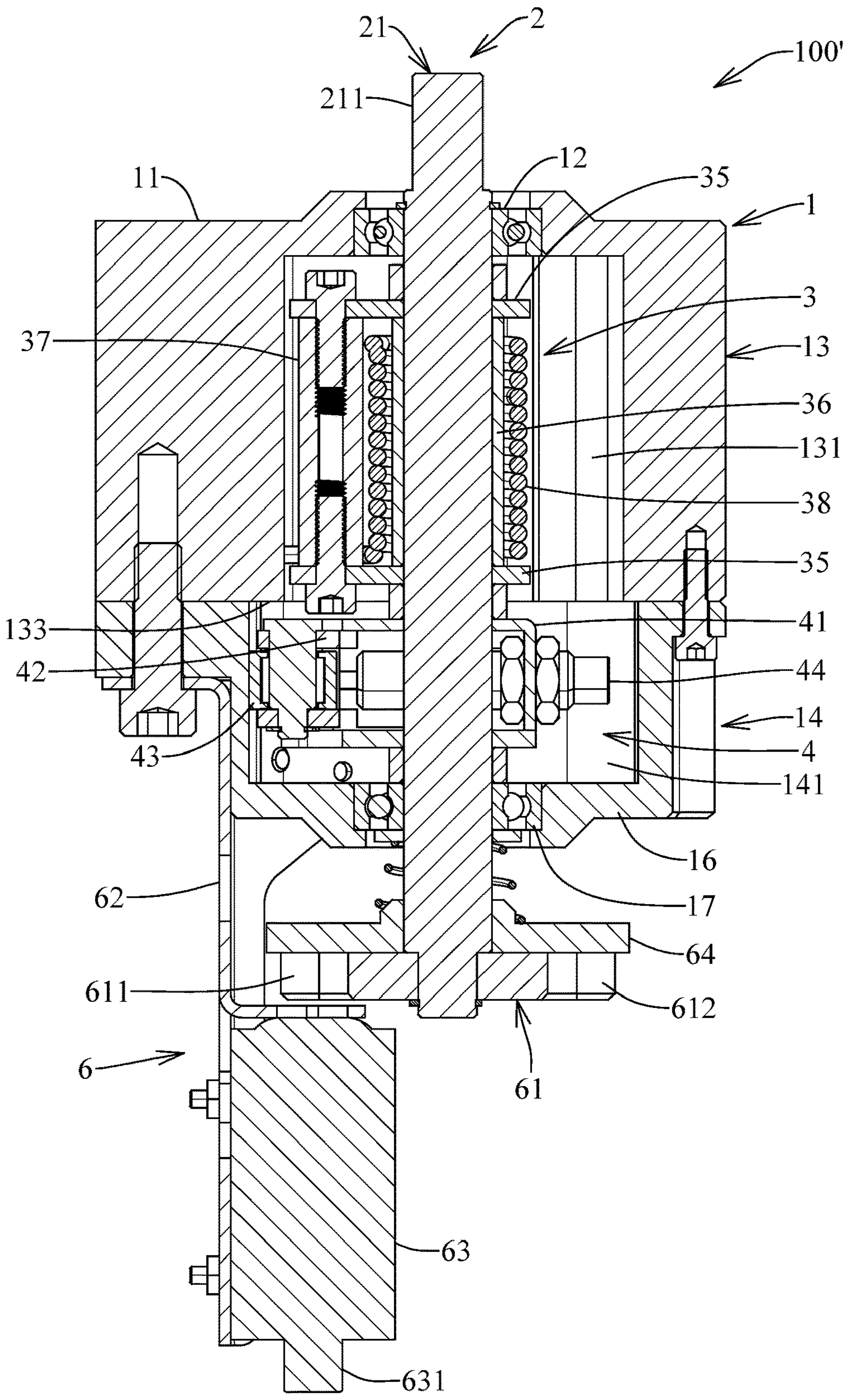
FIG. 22 is a sectional view taken along line XXII-XXII of FIG. 19.
Figure 23:
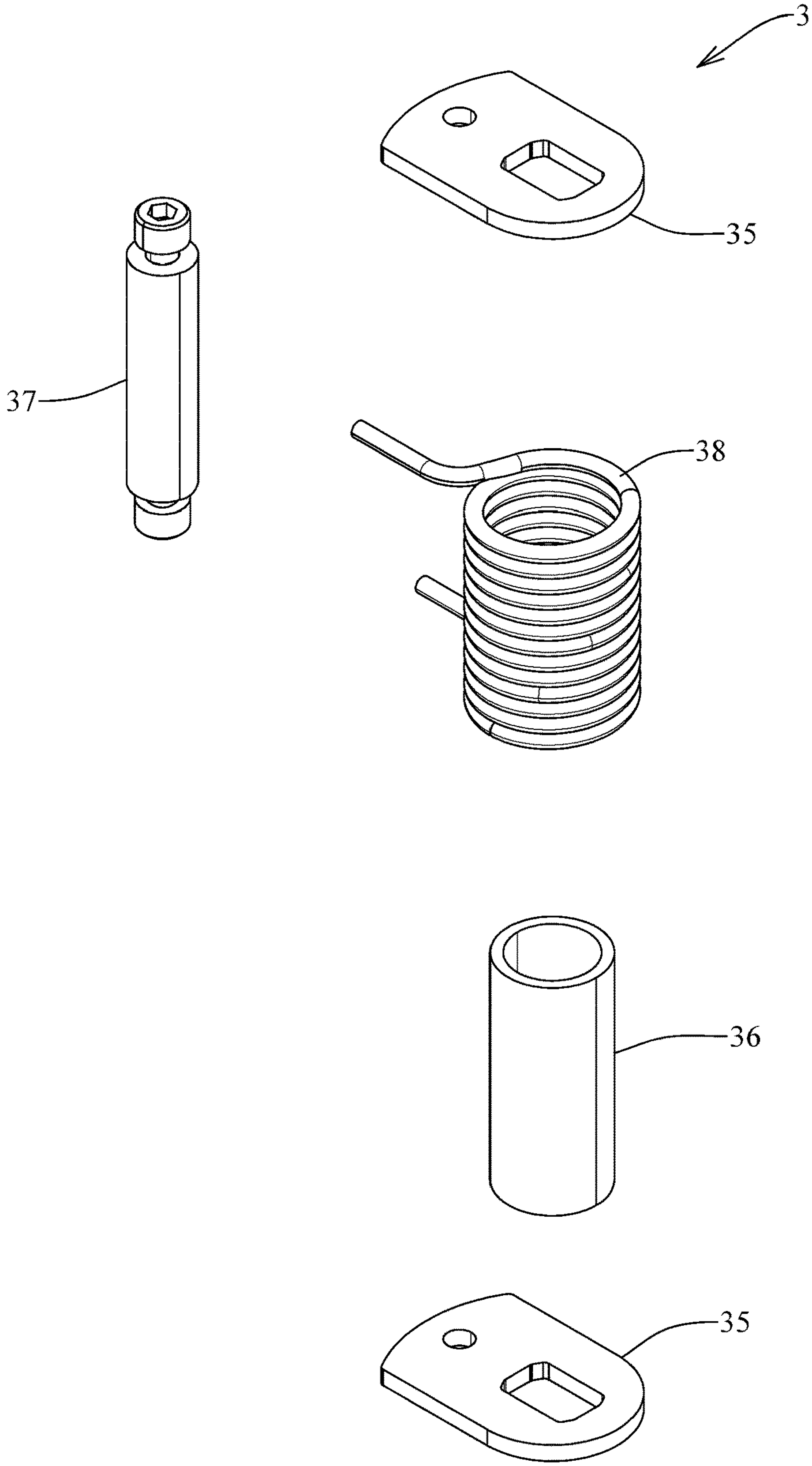
FIG. 23 is an exploded perspective view of a restoring unit of the second embodiment.
Figure 24:
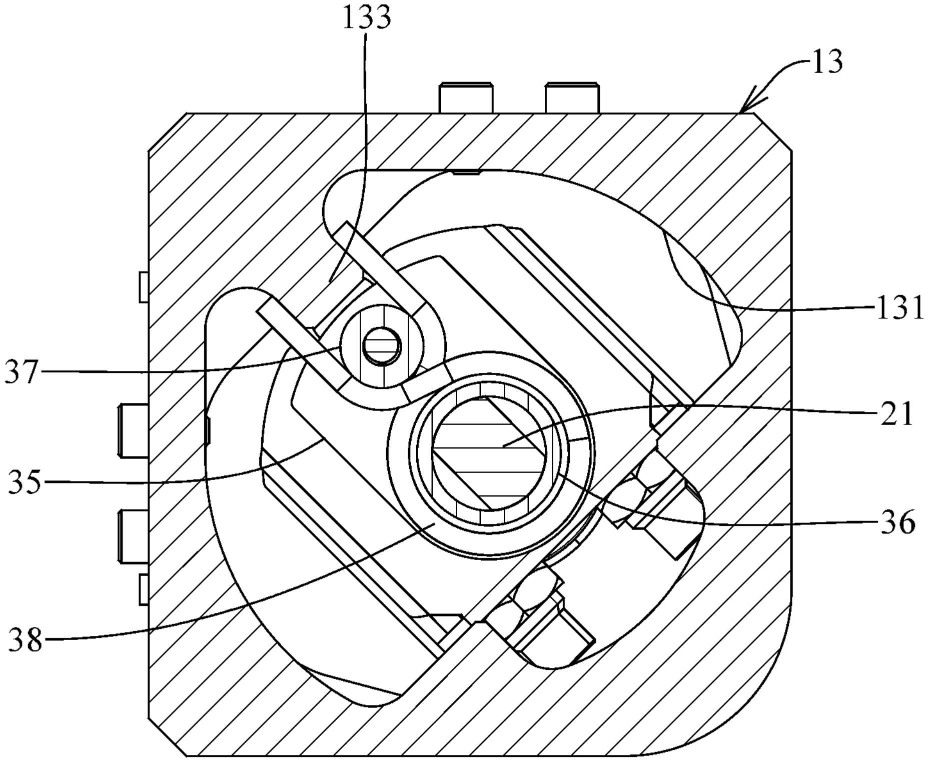
FIG. 24 is a sectional view taken along line XXIV-XXIV of FIG. 19.
Figure 25:
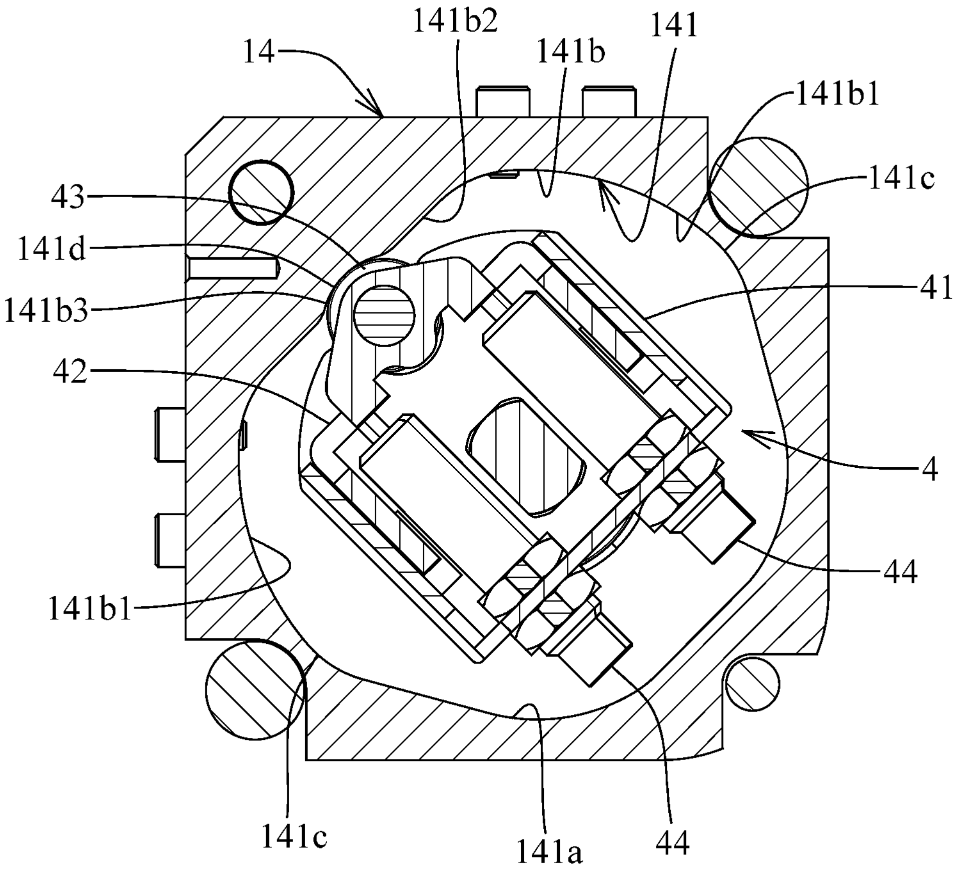
FIG. 25 is a sectional view taken along line XXV-XXV of FIG. 19.
Figure 26:
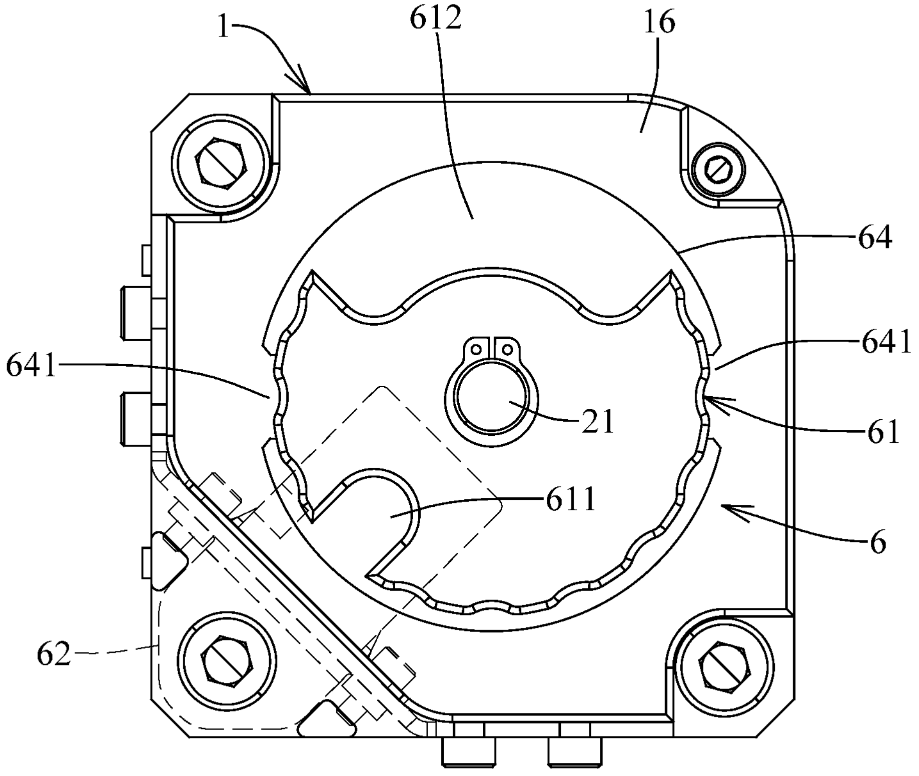
FIG. 26 is a schematic bottom view illustrating a lock plate of the second embodiment.
Figure 27:
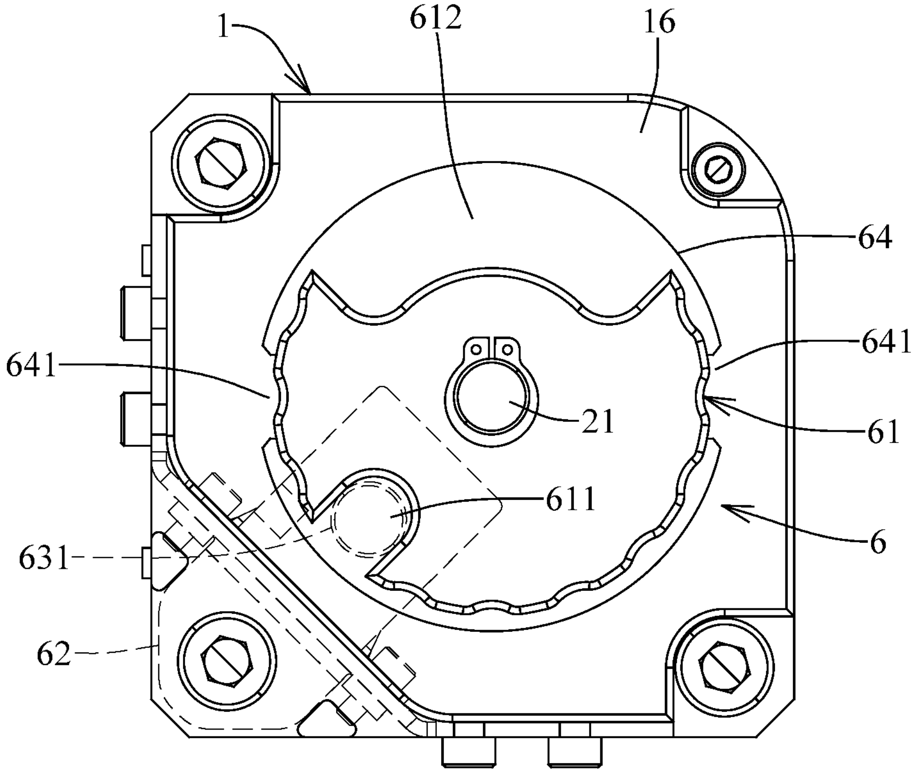
FIG. 27 is a schematic bottom view illustrating operation of the lock plate.
Figure 28:
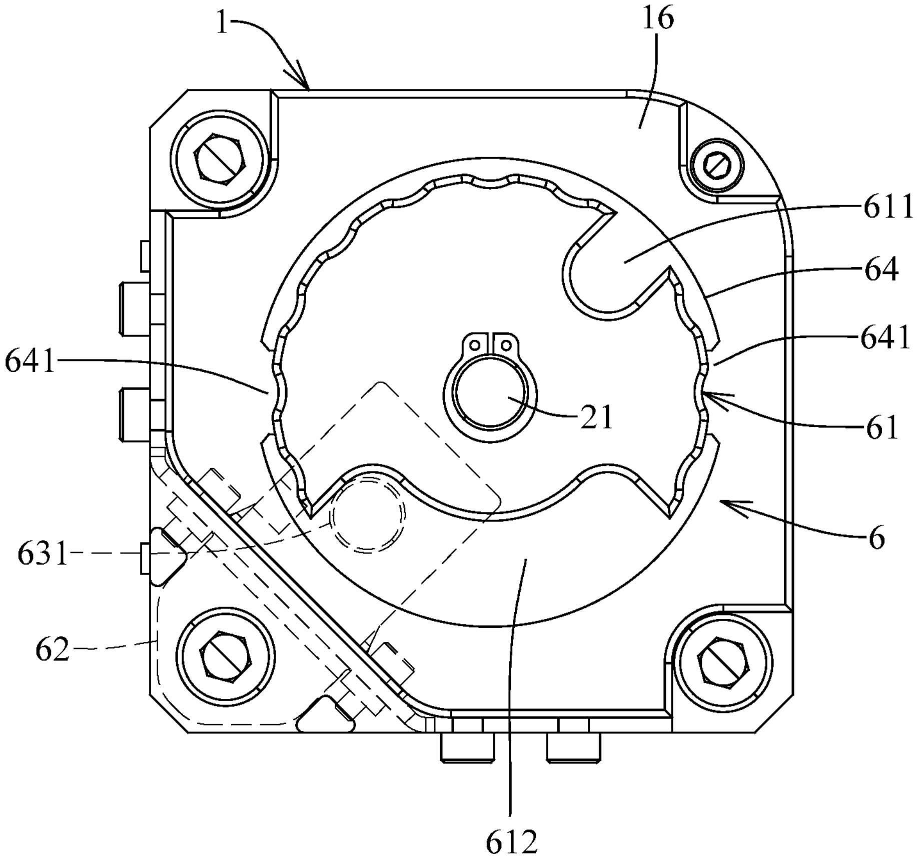
FIG. 28 is another schematic bottom view illustrating the operation of the lock plate.
Figure 29:
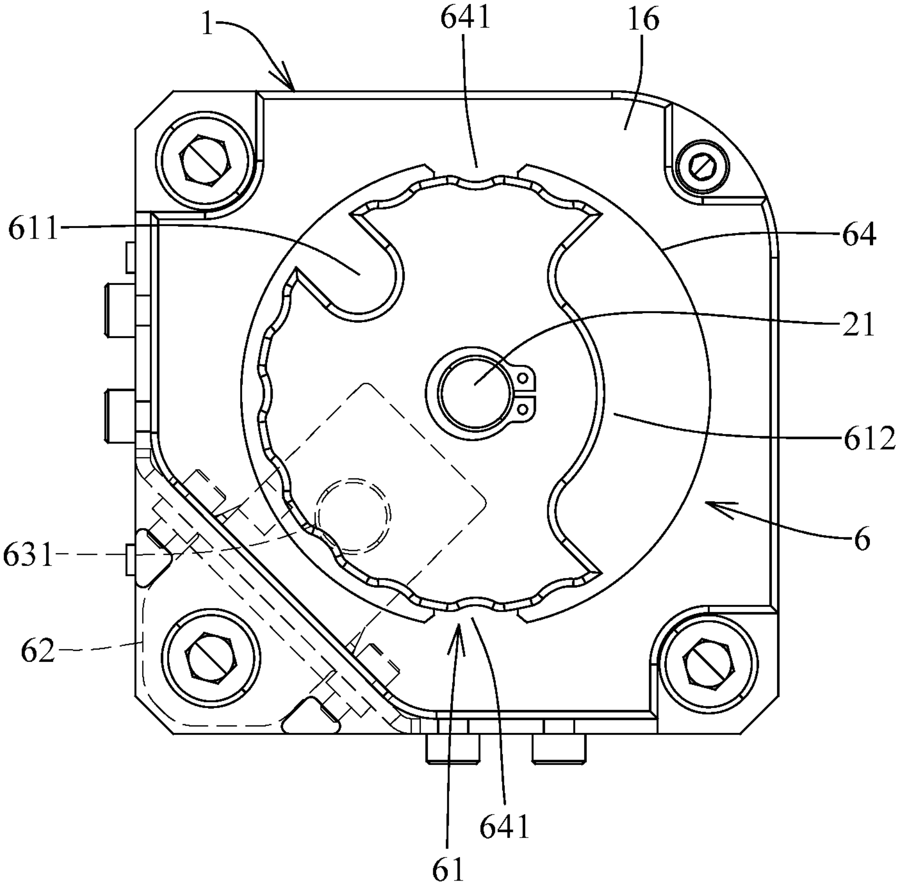
FIG. 29 is still another schematic bottom view illustrating the operation of the lock plate.
Figure 30:
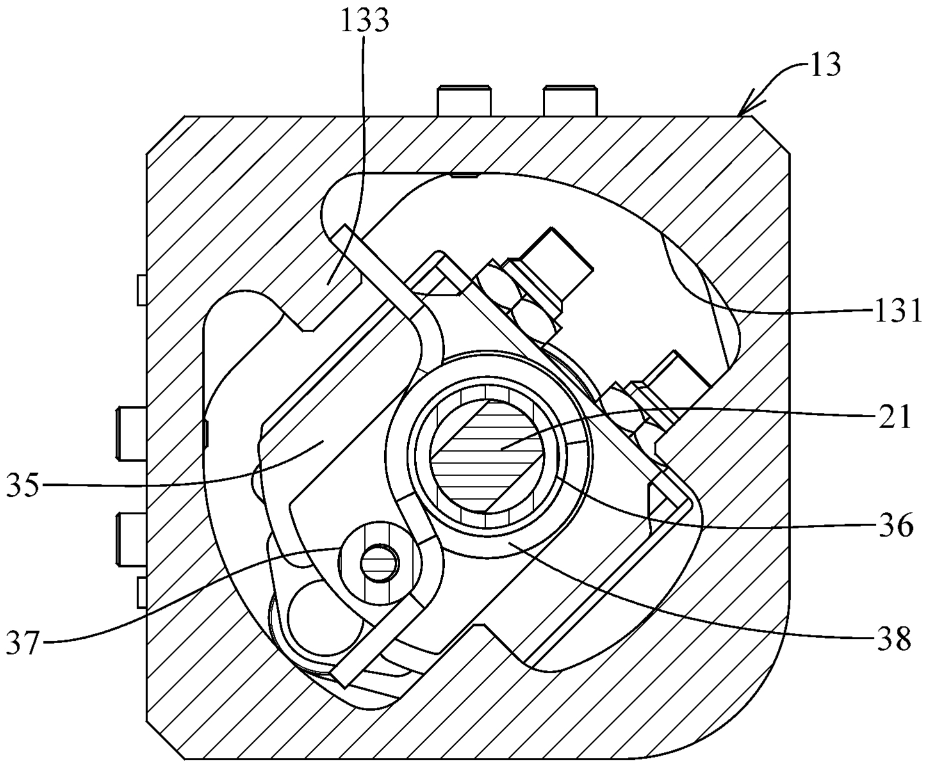
FIG. 30 is a schematic bottom view illustrating operation of the restoring unit.
Figure 31:
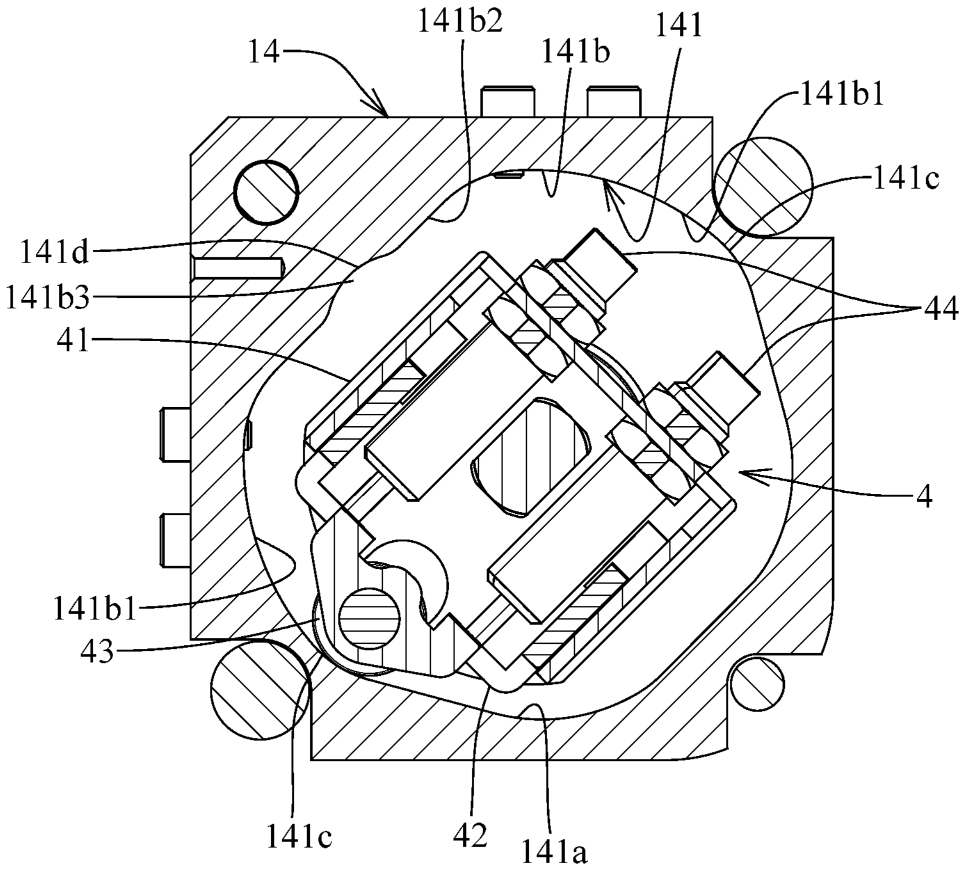
FIG. 31 is a schematic bottom view illustrating operation of a buffer unit of the second embodiment.

Referring to FIGS. 20, 25 and 31, the buffer unit 4 is similar to that of the first embodiment. The cushion members 44 are compressed when the buffer abutment wheel 43 engages the recess 141*b*3. During the switching of the rotation device 100' from the closing state to the opening state, the buffer abutment wheel 43 of the buffer unit 4 disengages from the recess 141*b*3 and moves from the intermediate portion 141*d* of the second inner surface 141 to one of the end portions 141*c* along the flat section 141*b*2 and one of the circular arc sections 141*b*1, and the cushion members 44 are switched from a compressed state to an uncompressed state (since the distance between the intermediate portion 141*d* and the upper axle 21 is shorter than that between the upper axle 21 and either one of the end portions 141*c*). During the switching of the rotation device 100 from the opening state to the closing state, the cushion members 44 are pushed by the second inner surface 141 to be compressed so as to damp the rotation of the upper axle 21, the restoring unit 3, the buffer unit 4, the lock plate 61, the switch plate 64 and the lower axle 22 back to their original positions. During the movement of the buffer abutment wheel 43 from the one of the end portions 141*c* to the intermediate portion 141*d*, the buffer abutment wheel 43 first travels on the one of the circular arc sections 141*b*1 and then on the flat section 141*b*2. The speed of the buffer abutment wheel 43 when travelling on the flat section 141*b*2 is higher than the speed of the buffer abutment wheel 43 when travelling on the circular arc section 141*b*1. As such, the damping effect in the second embodiment is better.

Referring to FIGS. 26 to 29, the lock unit 6 is similar to that of the first embodiment. The shape of the mounting casing 62 of this embodiment is slightly different from that of the first embodiment. The lock member 63 is a fail-safe electromagnetic lock, and has a lock portion. The lock portion has a lock tongue 631 that is movable in the top-bottom direction. The lock operation of the second embodiment is identical to that of the first embodiment. In the second embodiment, all of the modules are disposed along a straight line, so the second embodiment is suitable for a turnstile with an elongated inner space.

Figure 32:
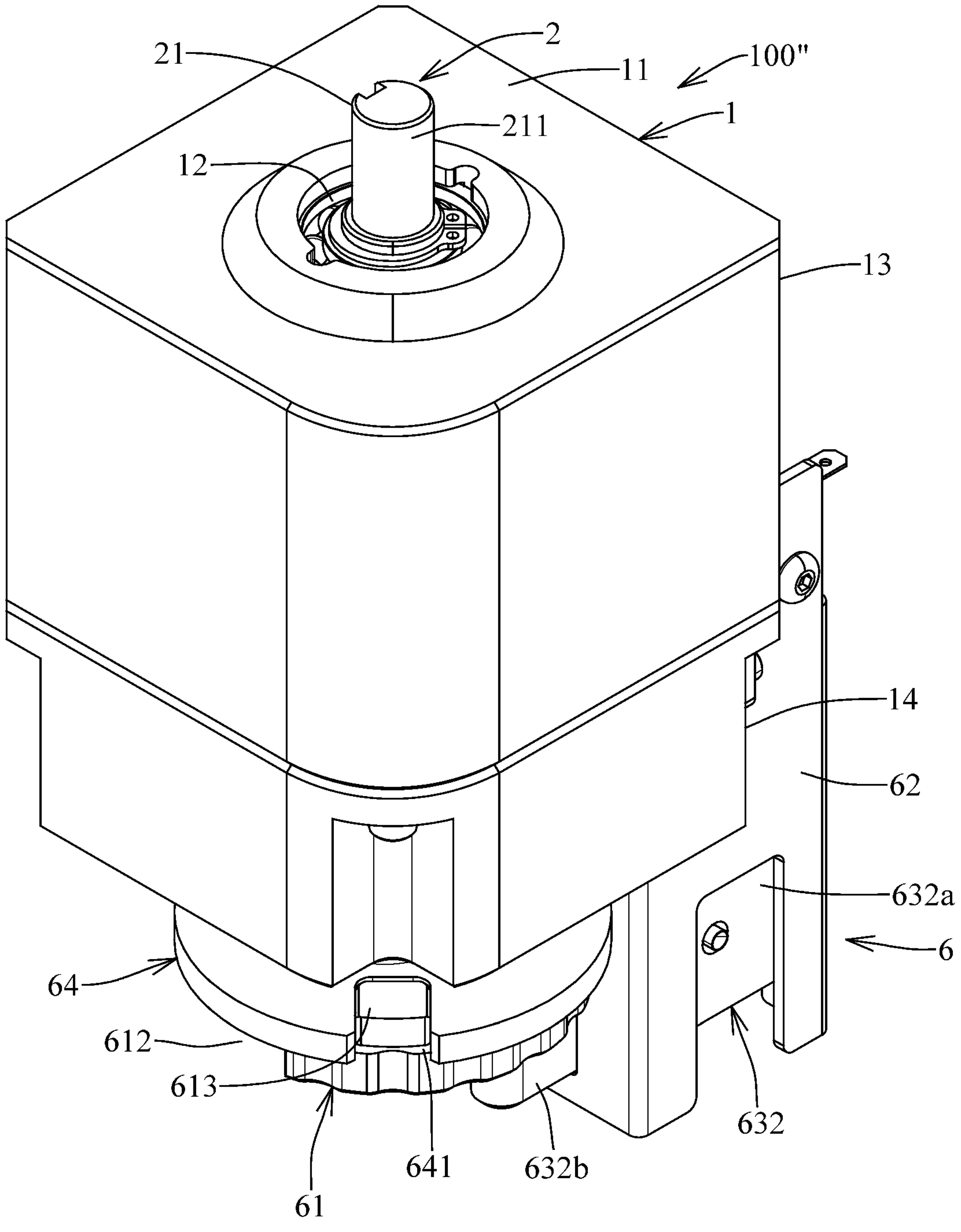
FIG. 32 is a perspective view illustrating a third embodiment of the rotation device according to the disclosure.
Figure 33:
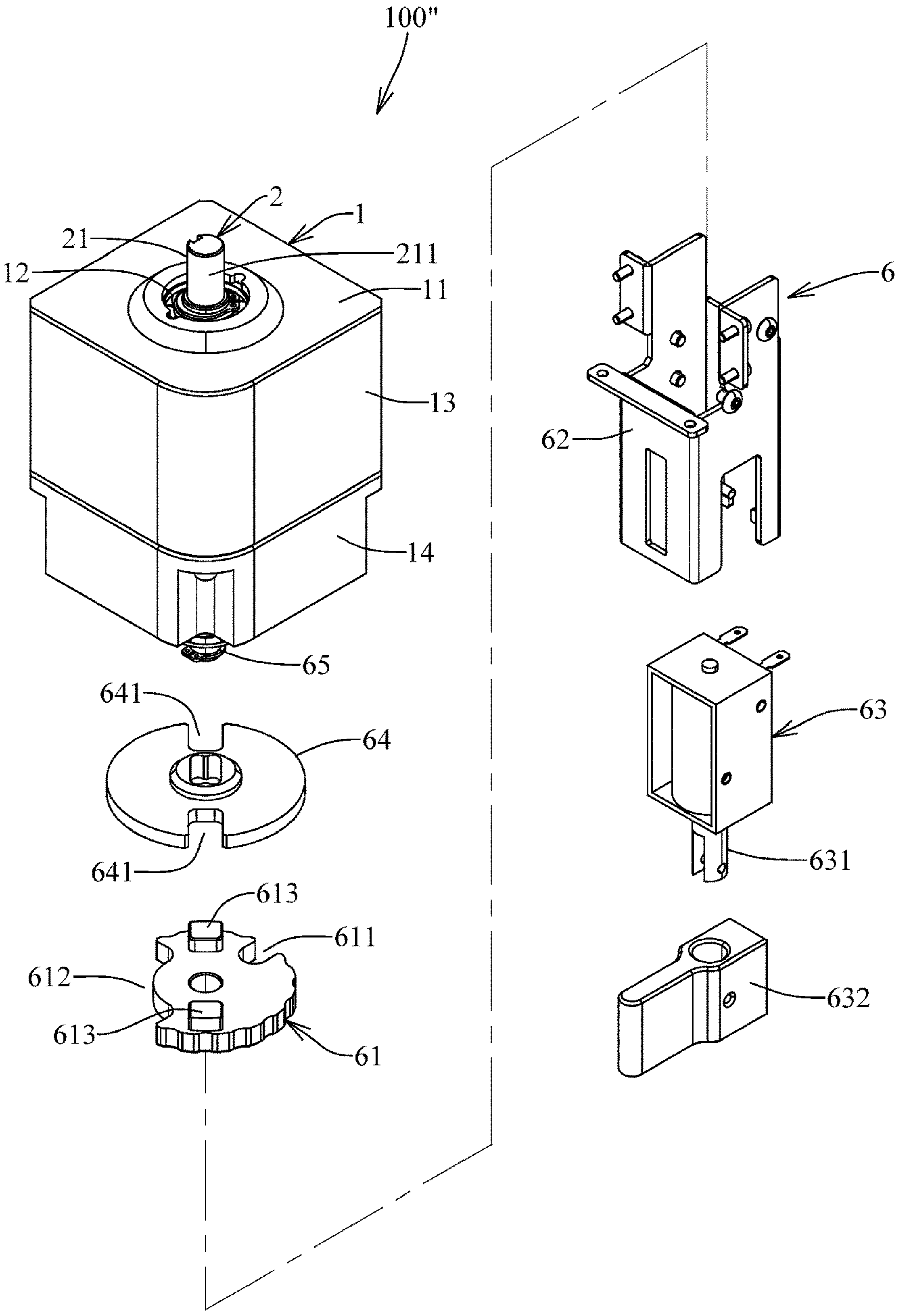
FIG. 33 is an exploded perspective view of the third embodiment.
Figure 34:
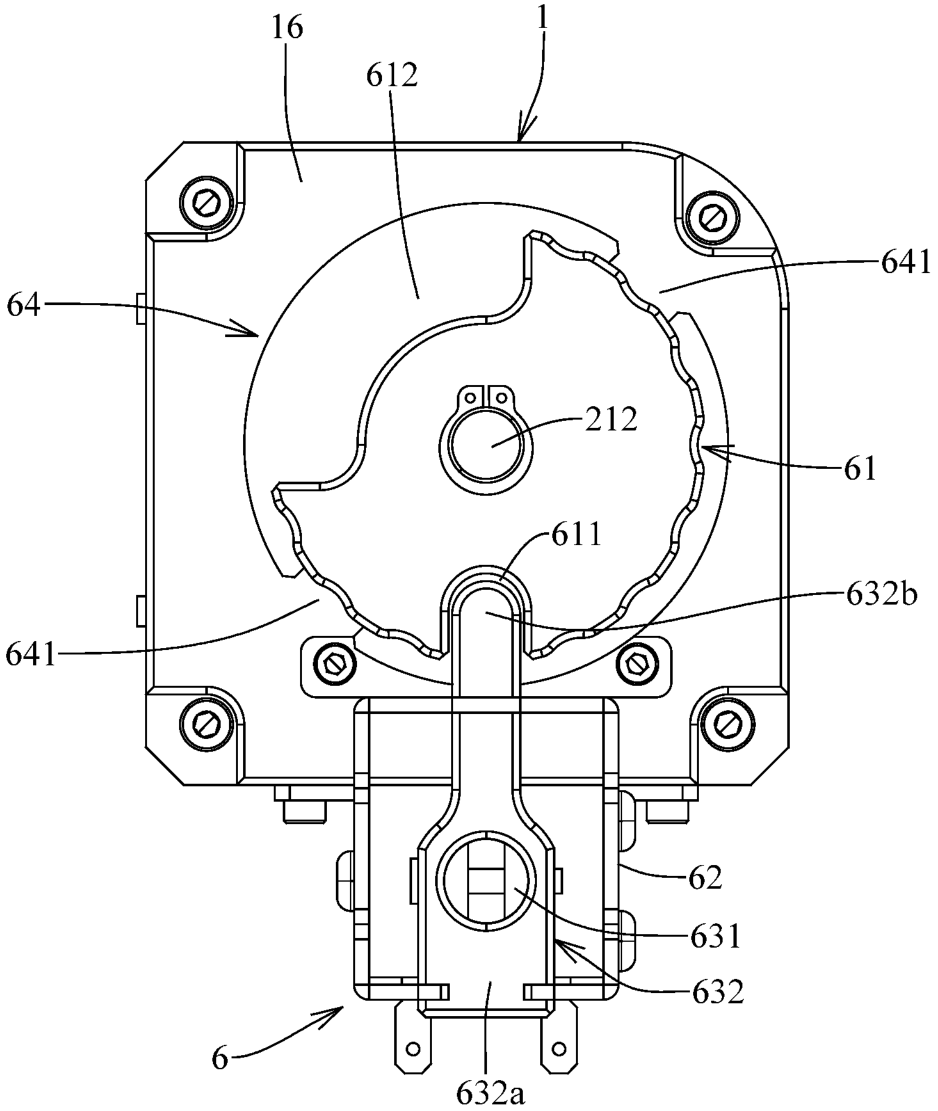
FIG. 34 is a schematic bottom view illustrating operation of a lock plate of the third embodiment.
Figure 35:
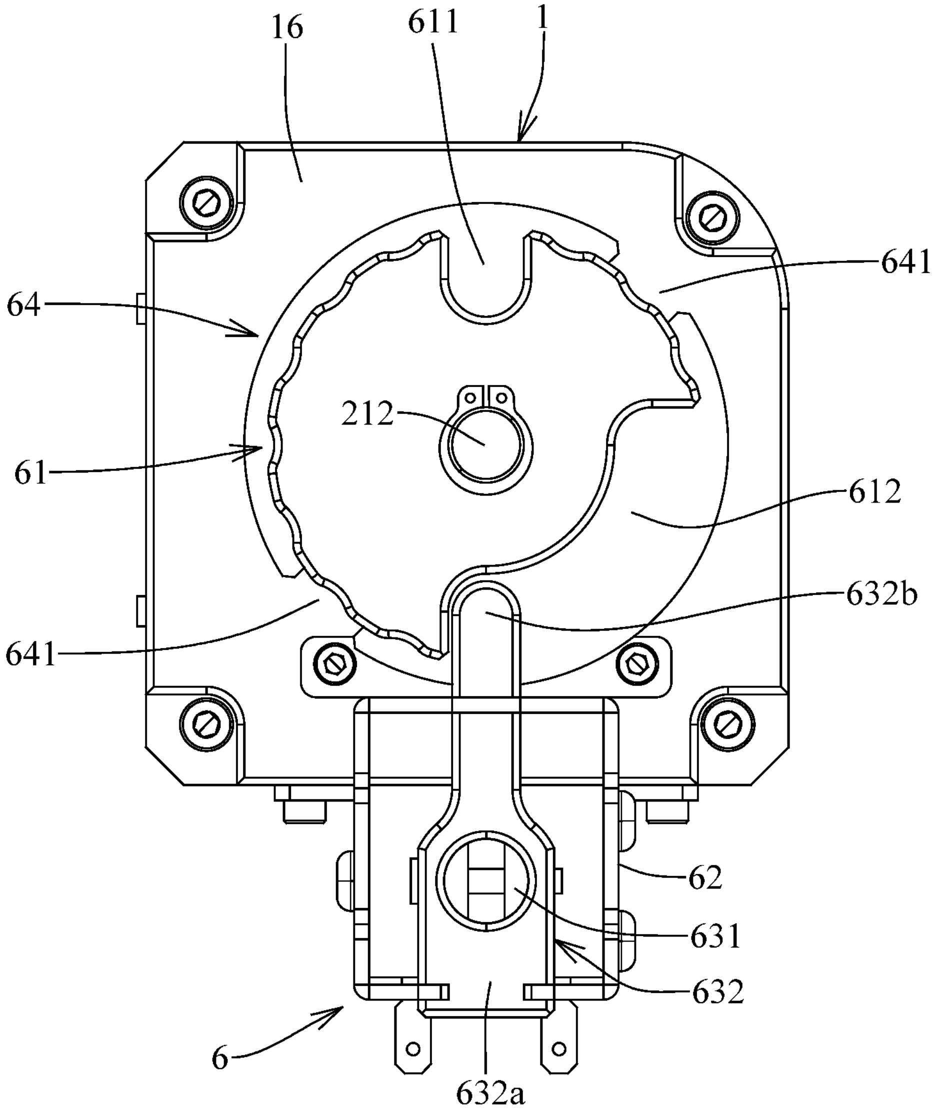
FIG. 35 is another schematic bottom view illustrating the operation of the lock plate.
Figure 36:
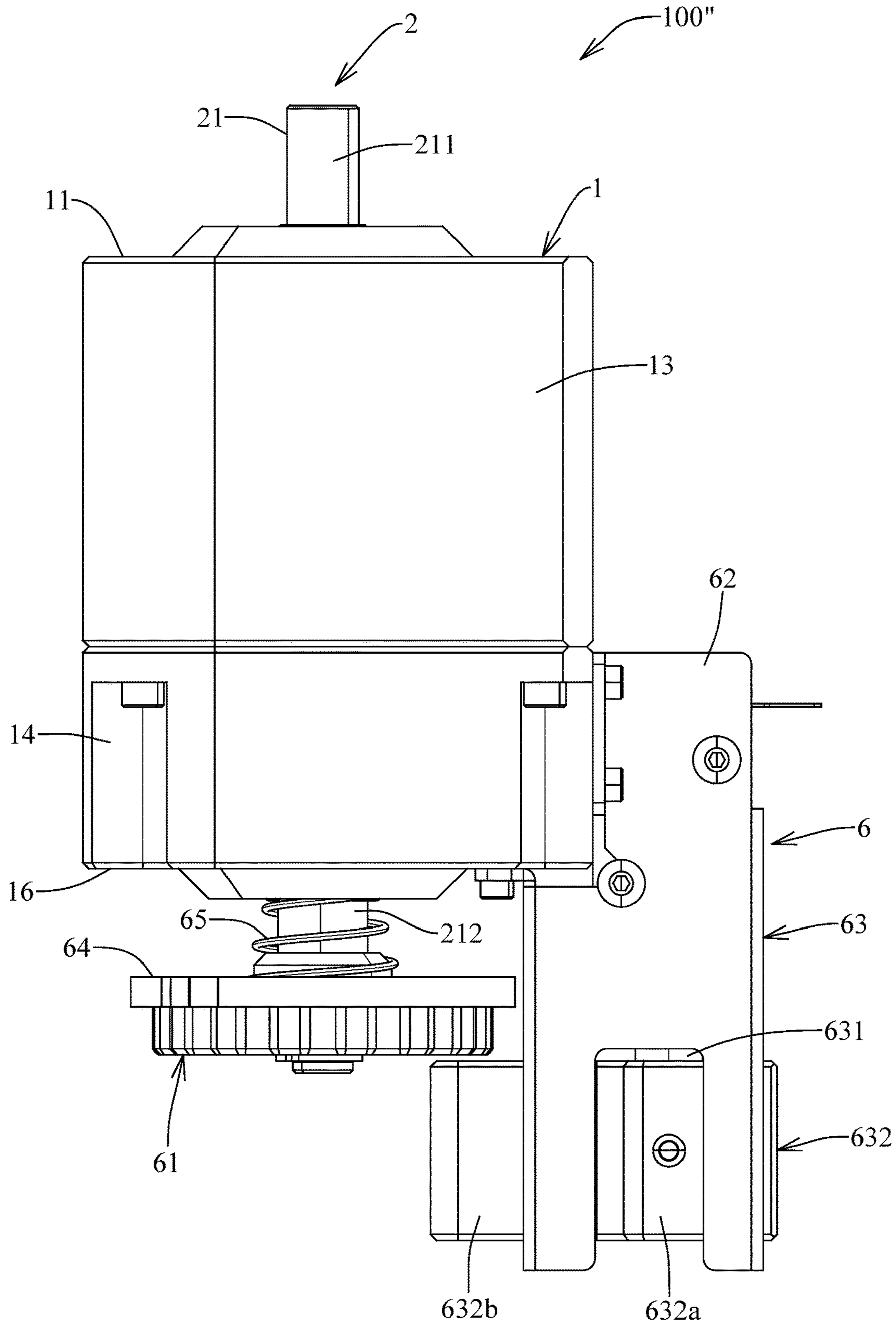
FIG. 36 is a schematic side view illustrating operation of a lock member of the third embodiment.
Figure 37:
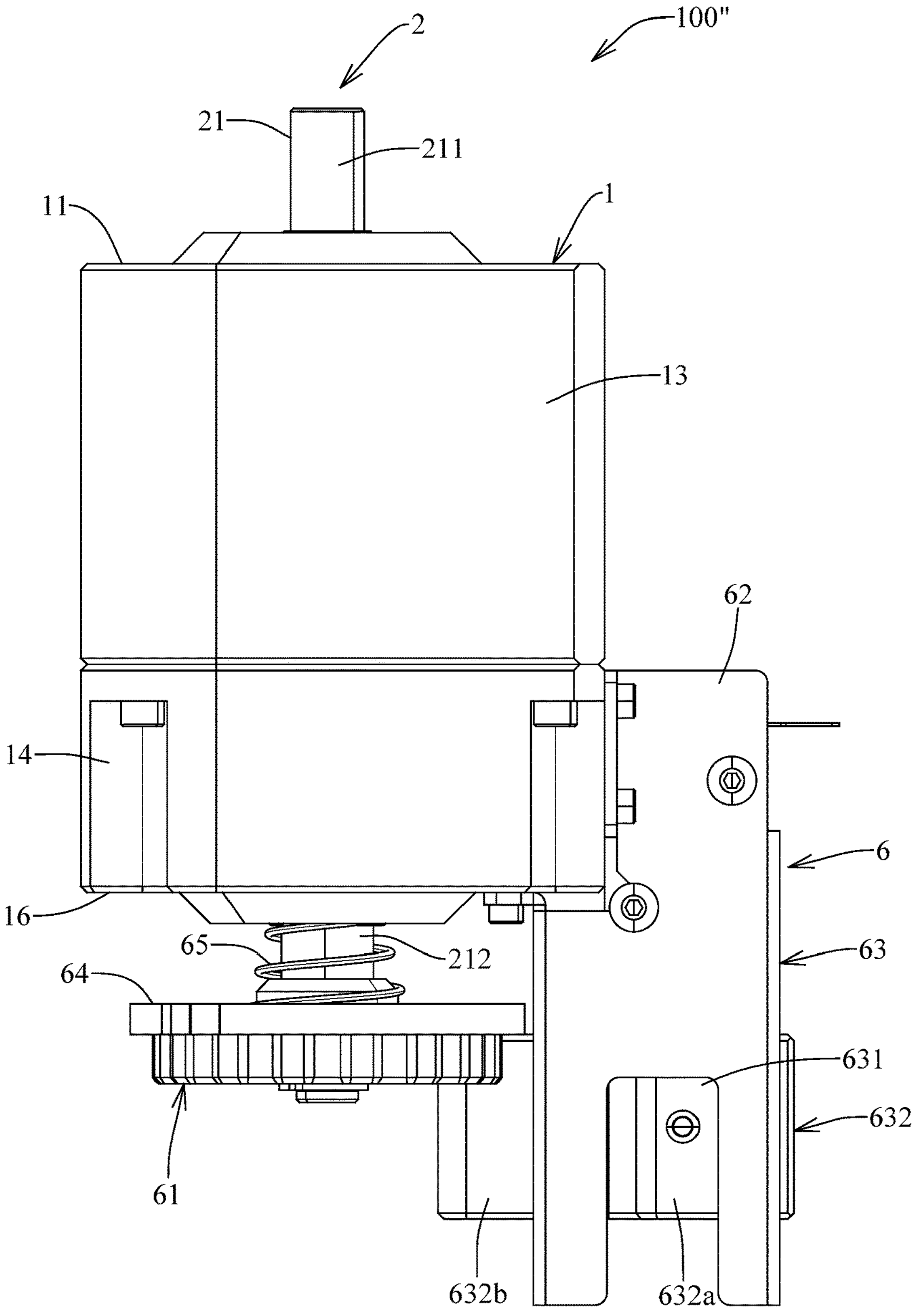
FIG. 37 is another schematic side view illustrating the operation of the lock member.

Referring to FIGS. 32 and 33, a third embodiment of the rotation device 100" according to the disclosure is similar to the second embodiment. In the third embodiment, the shape of the mounting casing 62 is slightly different from that of the second embodiment, and the lock plate 61, the switch plate 64 and the switch resilient member 65 are the same as those of the second embodiment. In this embodiment, the lock member 63 is a fail-safe electromagnetic lock, and has a lock portion. The lock portion has a lock tongue 631 that is movable in the top-bottom direction, and a slide block 632 that is co-movably connected to the lock tongue 631. The slide block 632 has a main body portion 632*a* that is connected to the lock tongue 631, and a projecting portion 632*b* that projects from the main body portion 632*a* and that is located below the lock plate 61 when the lock member 63 is not energized. The slide block 632 is movably mounted to the mounting casing 62 so as to be supported by the mounting casing 62. Referring to FIGS. 34 to 37, when the lock member 63 is energized, the lock tongue 631 moves the slide block 632 upwardly to engage the projecting portion 632*b* of the slide block 632 with the first lock groove 611 of the lock plate 61, so as to switch the rotation device 100" to the locking state. By virtue of the slide block 632 that is supported by the mounting casing 62, the magnitude of a resultant force acting on the lock tongue 631 during the operation may be reduced. To switch the rotation device 100", the lock plate 61 may be rotated by 180 degrees after the switch plate 64 is manually moved upwardly to separate the engaging grooves 641 from the protruding blocks 613 of the lock plate 61 so as to align the second lock groove 612 with the projecting portion 632*b* of the slide block 632 in the top-bottom direction, and the switch plate 64 is then released such that the switch resilient member 65 pushes the switch plate 64 to respectively engage the engaging grooves 641 with the protruding blocks 613 so as to prevent the relative rotation between the lock plate 61 and the switch plate 64. When the lock member 63 is energized after the abovementioned switching operation, the projecting portion 632*b* of the slide block 632 moves upwardly into the second lock groove 612. Because the second lock groove 612 is in the form of a quarter circular arc, the lock plate 61, the switch plate 64 and the lower axle 22 are not prevented from rotation by the projecting portion 632*b* of the slide block 632, and are rotatable in at least one rotational direction.

Figure 38:
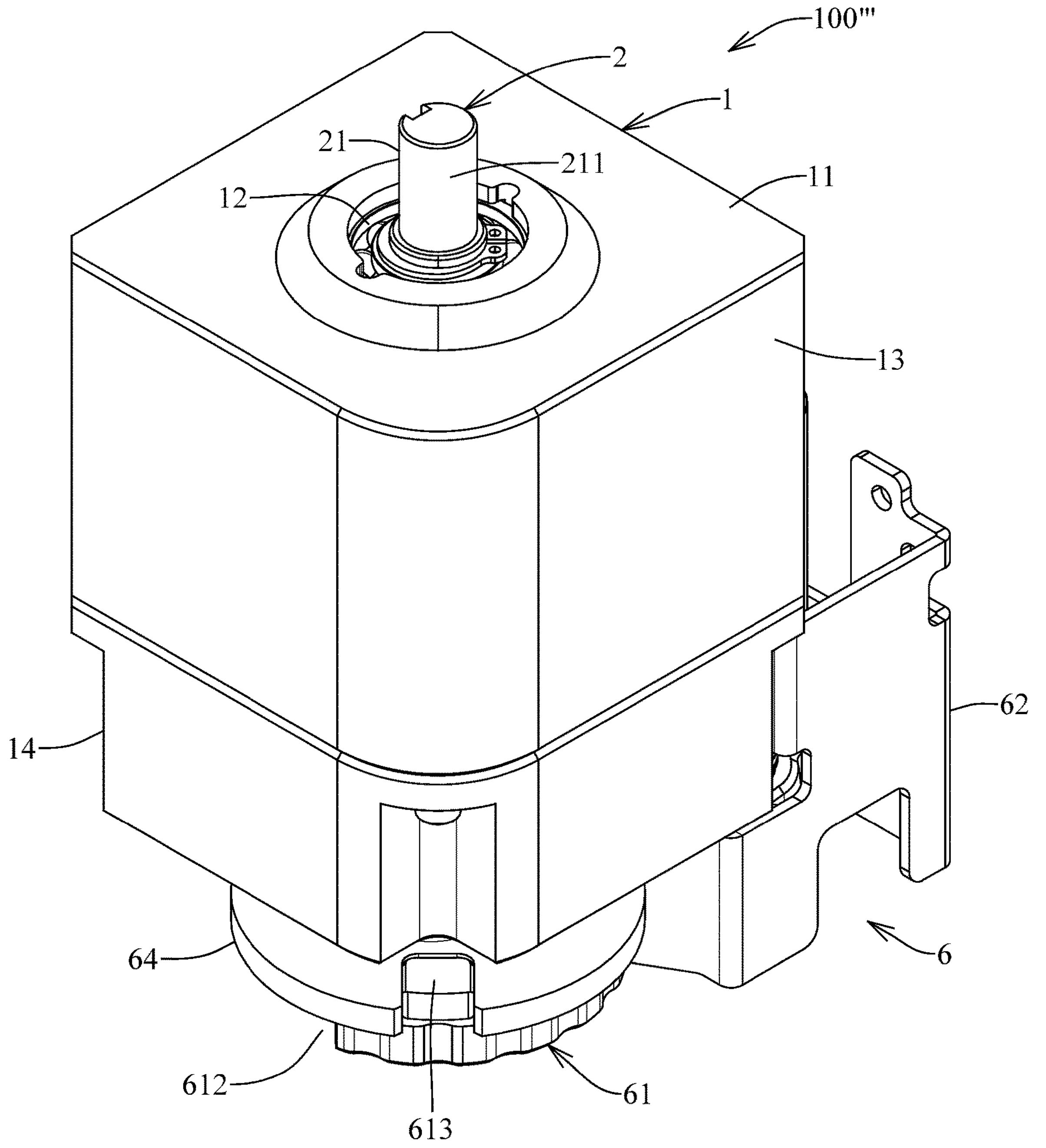
FIG. 38 is a perspective view illustrating a fourth embodiment of the rotation device according to the disclosure.
Figure 39:
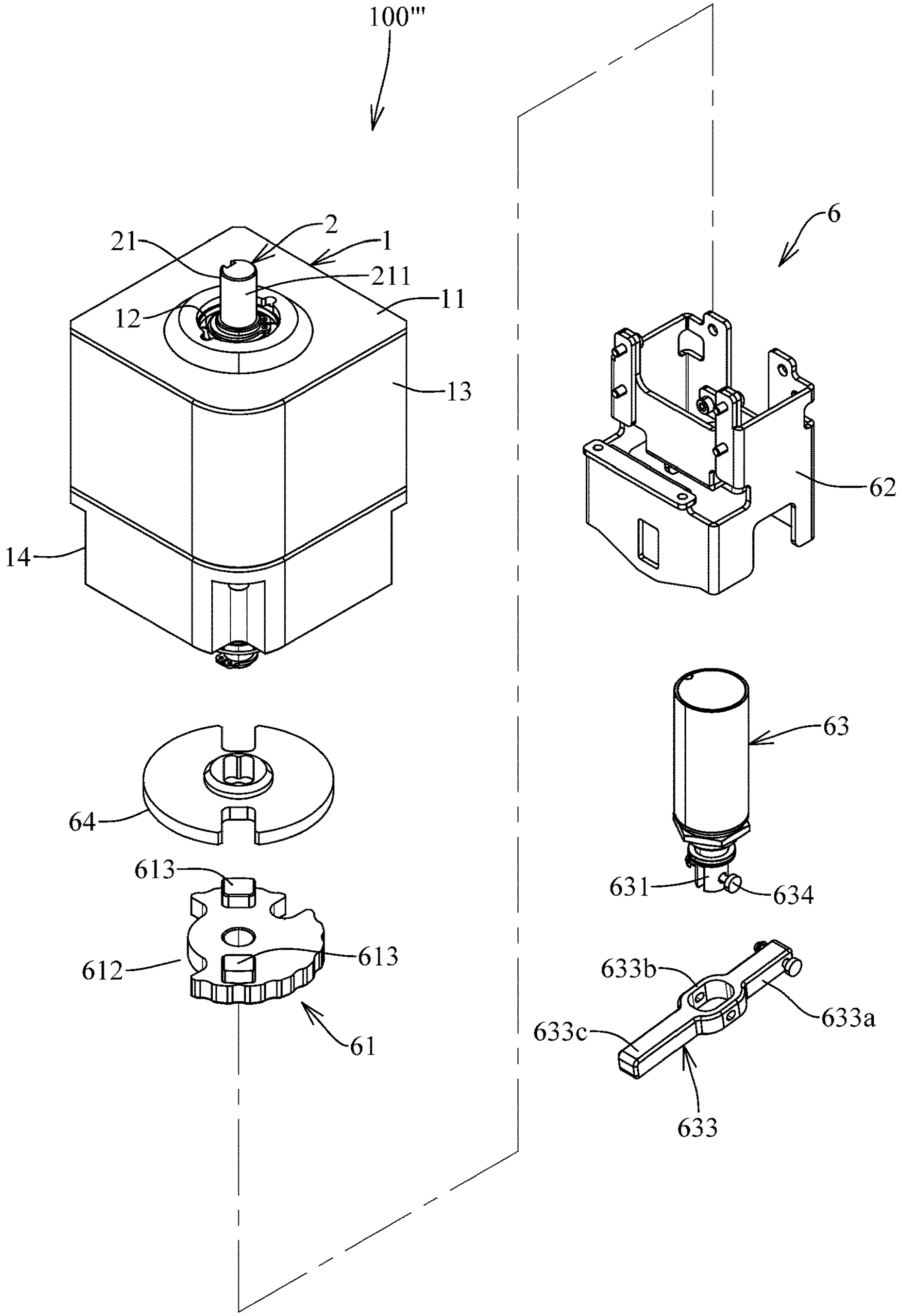
FIG. 39 is a partly exploded perspective view of the fourth embodiment.
Figure 40:
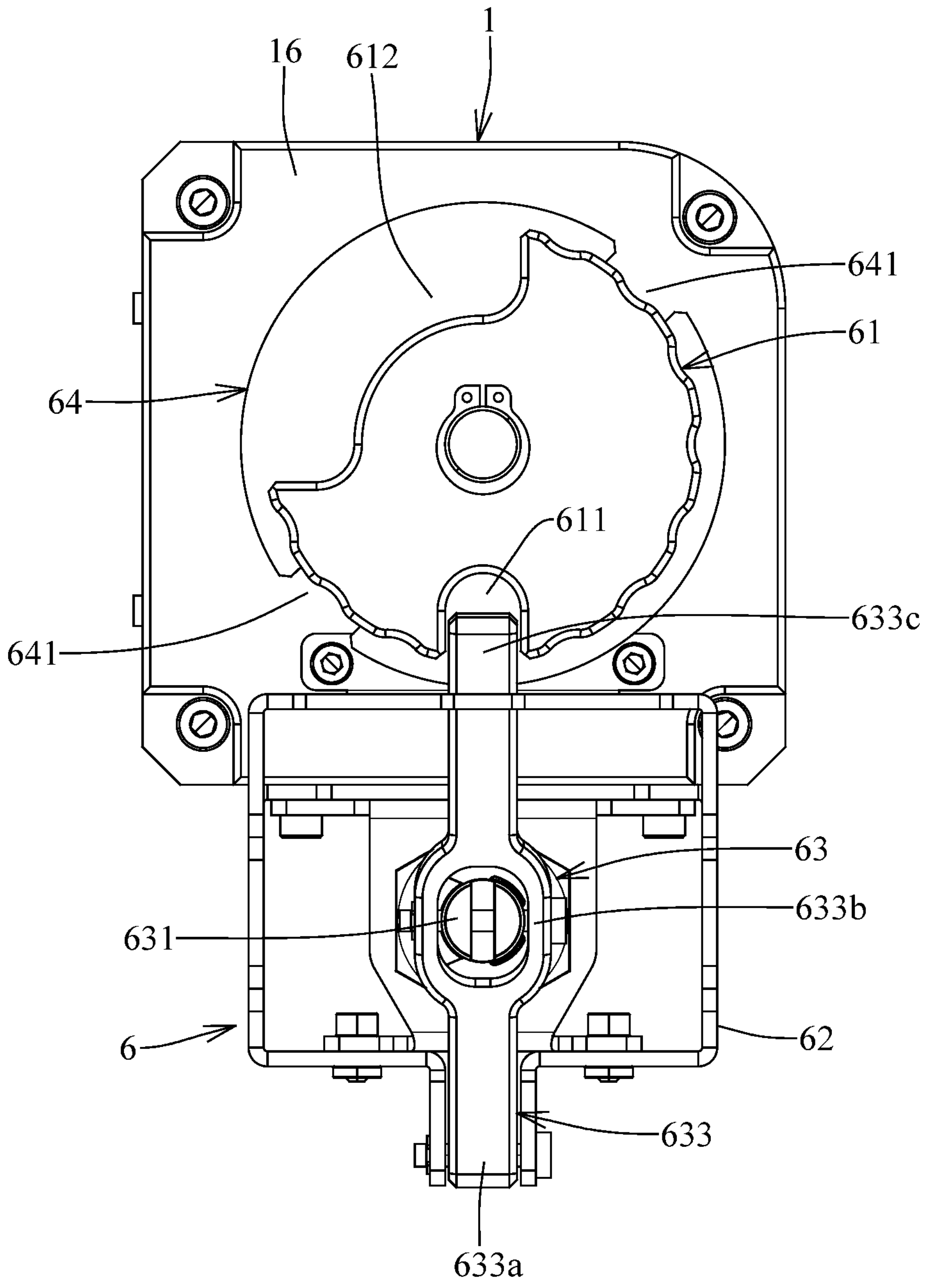
FIG. 40 is a schematic bottom view illustrating operation of a lock plate of the fourth embodiment.
Figure 41:
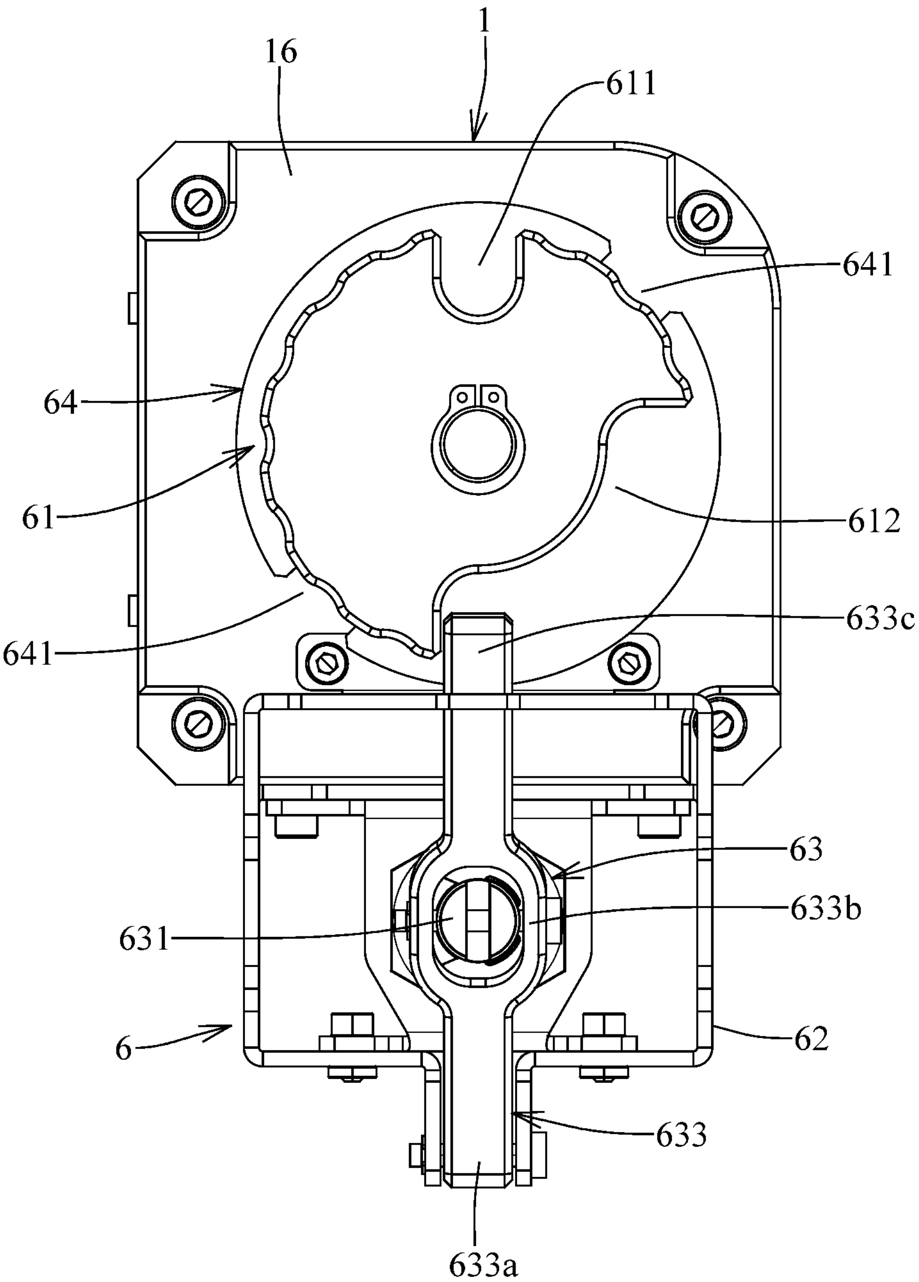
FIG. 41 is another schematic bottom view illustrating the operation of the lock plate.
Figure 42:
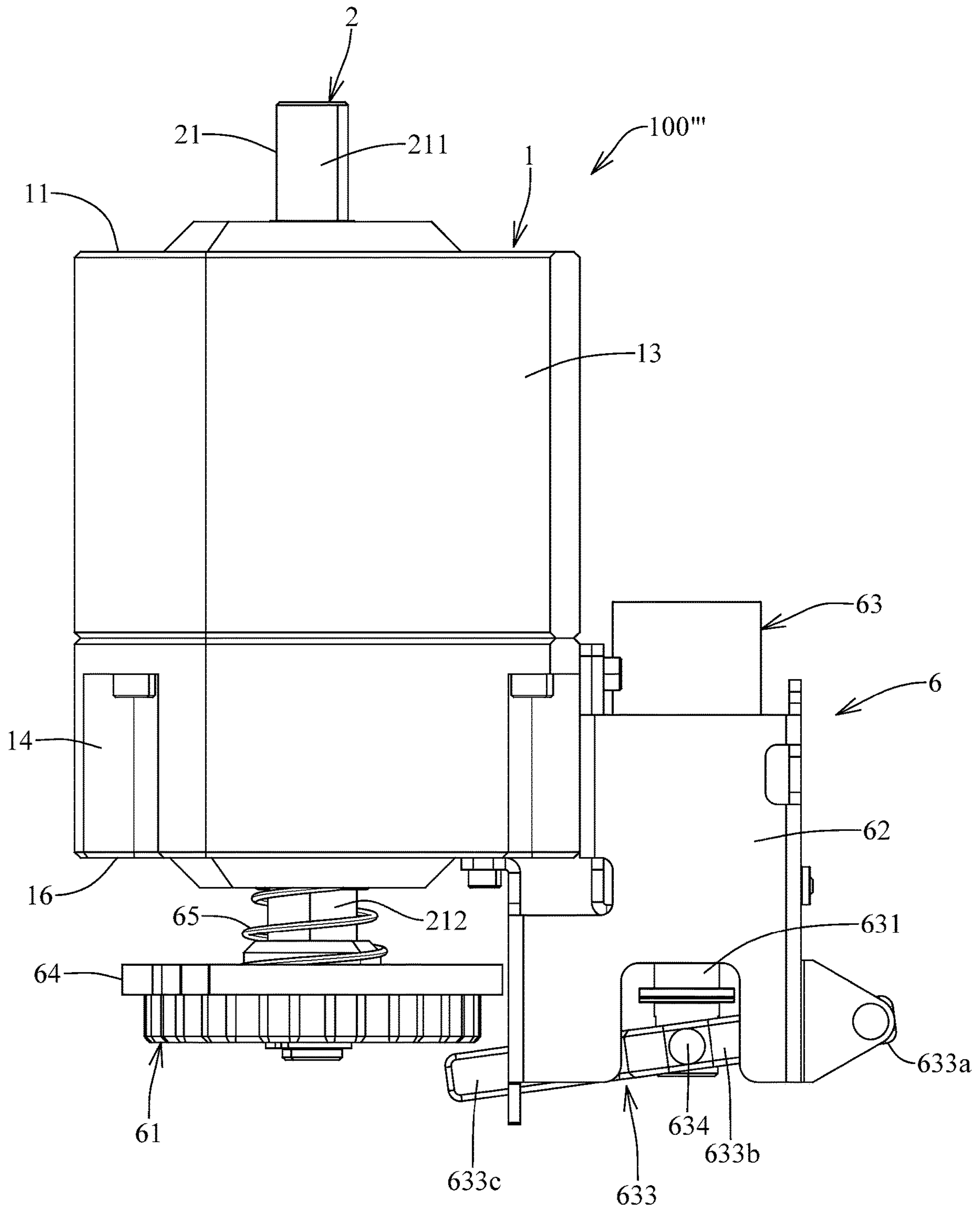
FIG. 42 is a schematic side view illustrating operation of a lock member of the fourth embodiment.
Figure 43:
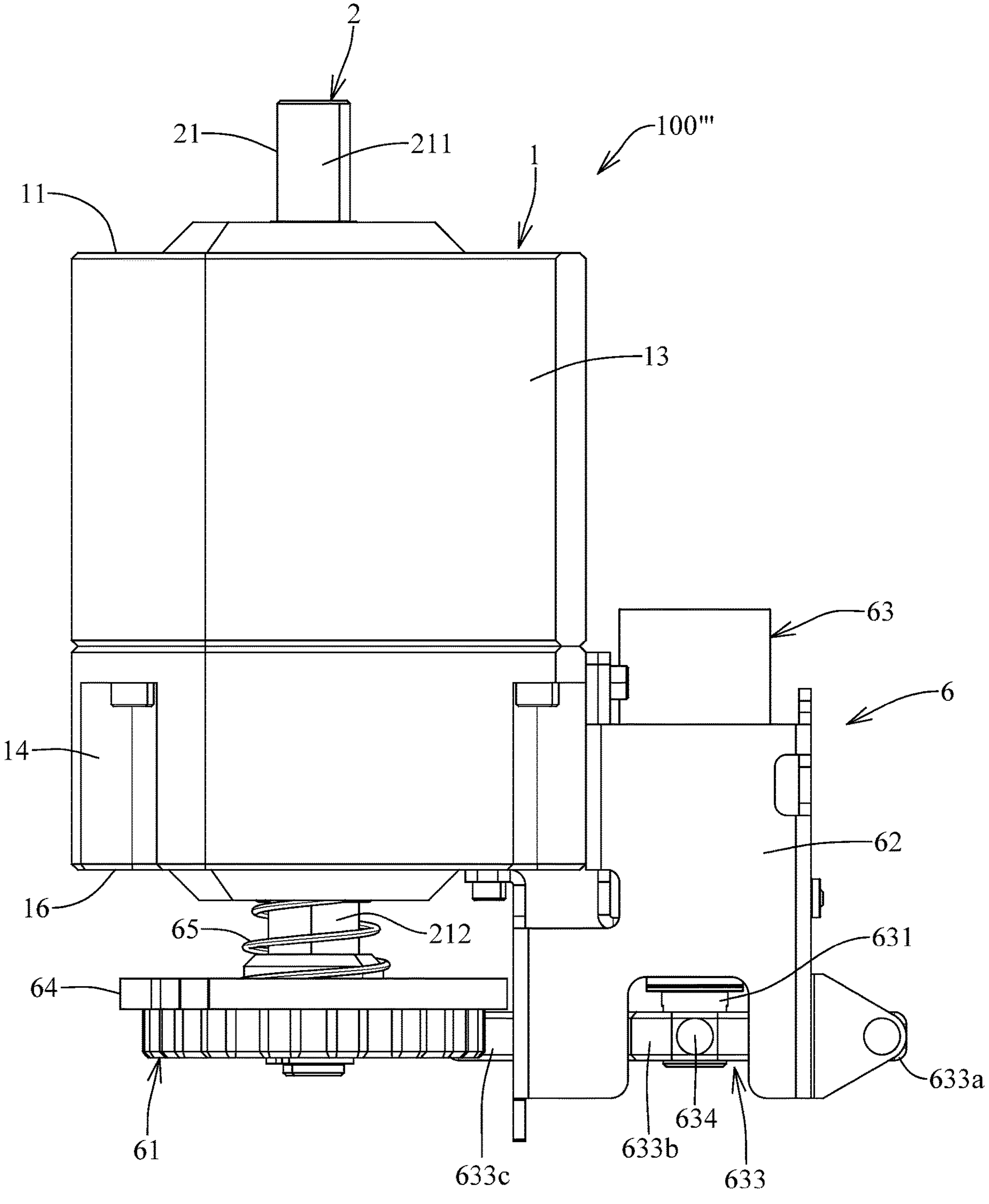
FIG. 43 is another schematic side view illustrating the operation of the lock member.

Referring to FIGS. 38 and 39, a fourth embodiment of the rotation device 100"' according to the disclosure is similar to the third embodiment. In the fourth embodiment, the shape of the mounting casing 62 is different from that of the third embodiment, and the lock plate 61, the switch plate 64 and the switch resilient member 65 are the same as those of the third embodiment. In this embodiment, the lock member 63 is a fail-safe electromagnetic lock, and has a lock portion. The lock portion has a lock tongue 631 that is movable in the top-bottom direction, and a pivot rod 633 that is connected to the lock tongue 631 and that has an end pivotally connected to the mounting casing 62. The pivot rod 633 has a pivoted portion 633*a* that is pivotally connected to the mounting casing 62, a coupling portion 633*b* that is connected to the pivoted portion 633*a* and that permits the lock tongue 631 to extend therethrough, and a latch portion 633*c* that is connected to the coupling portion 633*b* and that is located below the lock plate 61 when the lock member 63 is not energized. The coupling portion 633*b* is pivotally connected to the lock tongue 631 by a pin 634 so that the coupling portion 633*b* of the pivot rod 633 is rotatable relative to the lock tongue 631. The pivot rod 633 is movably mounted to the mounting casing 62 so as to be supported by the mounting casing 62. Referring further to FIGS. 40 to 43, when the lock member 63 is energized, the lock tongue 631 moves upwardly to rotate the pivot rod 633 toward the lock plate 61 so that the latch portion 633*c* engages the first lock groove 611 of the lock plate 61 to switch the rotation device 100"' to the locking state. By virtue of the configuration of the pivot rod 633 and the lock tongue 631, the lock tongue 631 may move by a relatively short distance to switch the rotation device 100"' to the locking state. An electromagnetic lock with a relatively short stroke and a relative large attraction force is suitable for this embodiment. Moreover, by virtue of the pivot rod 633 supported by the mounting casing 62, the magnitude of a resultant force acting on the lock tongue 631 during the operation may be reduced. The operation of the switch plate 64 of the fourth embodiment of the rotation device 100"' is the same as that of the abovementioned embodiments.

It should be noted that each of the second, third and fourth embodiments may additionally be equipped with the overload protection unit of the first embodiment as long as the lower axle 22 of the axle unit 2 of the first embodiment is provided therein. According to this disclosure, each of the restoring unit 3, the buffer unit 4 and the overload protection unit 5 is modularized, and may be selectively added on the rotation device according to actual needs.

In summary, the rotation device 100, 100', 100", 100"' has relatively low power consumption by virtue of the cooperation among the electromagnetic lock 63, the lock plate 61, the switch plate 64 and the axle unit 2. By virtue of the restoring unit 3, after the user passes the gateway, the barrier may automatically rotate back to its original position. By virtue of the buffer unit 4, when the barrier rotates back to its original position, the rotational speed of the barrier is relatively slow so as to prevent the next user from being injured by the barrier. By virtue of the overload protection unit 5, when a force pushing the barrier exceeds a predetermined value, the overload abutment wheel assemblies 53 are able to respectively disengage from engaging grooves 511 of the outer barrel 51 against the biasing action of the overload resilient member 54 and move along the inner surface of the outer barrel 51 so that the upper rotating module 20 is driven by the upper axle 21 to rotate relative to the lower rotating module 30 to prevent the interior components of the rotation device from being damaged. By virtue of the lock unit 6, users may need to be identified for passing the gateway of the turnstile in both directions (i.e., the lock member 63 engages the first lock groove 611 of the lock plate 61), or need to be identified for passing the gateway of the turnstile in only one direction (i.e., the lock member 63 engages the second lock groove 612 of the lock plate 61). In addition, each of the restoring unit 3, the buffer unit 4 and the overload protection unit 5 is modularized, and may be selectively added on the rotation device according to actual needs.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A rotation device adapted for a turnstile, comprising:

a base seat;

an axle unit including an upper axle that extends into the base seat, and a lower axle that extends into the base seat and that is located below the upper axle;

a lower rotating module including a lock unit, and an outer barrel that is disposed in the base seat and that is penetrated by the lower axle, the lock unit including a lock plate that is sleeved on the lower axle, and a lock member that is mounted to the base seat, the lock plate being formed with a first lock groove, the lock member having a lock portion that is operable to move into the first lock groove; and an upper rotating module disposed in the base seat and co-rotatably sleeved on the upper axle, the upper rotating module being able to be driven by the upper axle to rotate relative to the lower rotating module;

wherein the upper rotating module includes an overload rotating bracket that is received in the outer barrel and that is penetrated by the upper axle, an inner surface of the outer barrel being formed with two engaging grooves, the overload rotating bracket including two overload abutment wheel assemblies, and an overload resilient member that is located between the overload abutment wheel assemblies, the overload abutment wheel assemblies being able to respectively engage the engaging grooves of the outer barrel.

2. The rotation device as claimed in claim 1, wherein the upper rotating module includes a restoring unit that permits the upper axle to extend therein, the upper axle being at an original position when the upper axle is not rotated by an external force, the restoring unit being for restoring the upper axle to the original position after the upper axle is rotated.

3. The rotation device as claimed in claim 2, wherein the base seat includes a first casing that accommodates the restoring unit, the first casing having a first inner surface, the first inner surface defining an elliptic first opening that extends in a top-bottom direction, the first opening having two opposite major axial ends and two opposite minor axial ends, a distance between the major axial ends being longer than that between the minor axial ends, the restoring unit including a restoring rotating bracket that is co-rotatably connected to and penetrated by the upper axle, two restoring moving brackets that are movably mounted to the restoring rotating bracket, two restoring abutment wheels that are respectively mounted to the restoring moving brackets and that abut against the first inner surface of the first casing, and at least one restoring resilient member that is disposed between the restoring moving brackets, the restoring unit being at an original position when the restoring unit is not rotated, rotation of the upper axle driving rotation of restoring unit such that the restoring abutment wheels of the restoring unit move from the major axial ends to the minor axial ends, and that the restoring moving brackets are pushed by the first inner surface of the first casing to approach each other and to compress the restoring resilient member, a restoring force generated by the restoring resilient member serving for rotating the upper axle back to the original position and rotating the restoring unit back to the original position.

4. The rotation device as claimed in claim 2, wherein the base seat includes a first casing that accommodates the restoring unit, the first casing having a first inner surface, the first inner surface defining a first opening that extends in a top-bottom direction, the first opening having a major axial end and a minor axial end, a distance between the major axial end and the upper axle being longer than that between the minor axial end and the uper axle, the restoring unit including a restoring rotating bracket that is co-rotatably connected to and penetrated by the upper axle, a restoring moving bracket that is movably mounted to the restoring rotating bracket, a restoring abutment wheel that is mounted to the restoring moving bracket and that abuts against the first inner surface of the first casing, and at least one restoring resilient member that is disposed between the restoring rotating bracket and the restoring moving bracket, the restoring unit being at an original position when the restoring unit is not rotated, rotation of the upper axle driving rotation of restoring unit such that the restoring abutment wheels of the restoring unit move from the major axial end to the minor axial end, and that the restoring moving bracket is pushed by the first inner surface of the first casing to move and compress the restoring resilient member, a restoring force generated by the restoring resilient member serving for rotating the upper axle back to the original position and rotating the restoring unit back to the original position.

5. The rotation device as claimed in claim 2, wherein the base seat includes a first casing that accommodates the restoring unit, the first casing having a first inner surface, and a protruding column that is formed on the first inner surface and that extends in a top-bottom direction, the restoring unit including two clamping plates, a tube member that has two opposite ends respectively connected to the clamping plates, a rotating column that has two opposite ends respectively connected to the clamping plates and that is spaced apart from the tube member, and a torsion spring that is rotatably sleeved on the tube member and that has two opposite leg portions, the upper axle co-rotatably extending through the clamping plates and extending through the tube member, one of the leg portions of the torsion spring abutting against one side of the protruding column and one side of the rotating column, the other one of the leg portions of the torsion spring abutting against an opposite side of the protruding column and an opposite side of the rotating column, the restoring unit being at an original position when the restoring unit is not rotated, rotation of the upper axle driving rotation of restoring unit such that the rotating column urges one of the leg portions of the torsion spring to rotate so as to deform the torsion spring, and that the deformed torsion spring is for rotating the restoring unit back to the original position and rotating the upper axle back to the original position.

6. The rotation device as claimed in claim 2, wherein the upper rotating module further includes a buffer unit that permits the upper axle to extend therein, the buffer unit being for damping the rotation of the upper axle when the upper axle rotates back to the original position.

7. The rotation device as claimed in claim 6, wherein the base seat includes a casing that accommodates the buffer unit, the casing having an inner surface, the second inner surface having a first half, and a second half that is connected to the first half, the second half having two opposite end portions that are connected to the first half, and an intermediate portion that is located between the end portions, a distance between the intermediate portion and the upper axle being shorter than that between the upper axle and either one of the end portions of the second half, the buffer unit including a buffer rotating bracket that is co-rotatably connected to and penetrated by the upper axle, a buffer moving bracket that is movably mounted to the buffer rotating bracket, a buffer abutment wheel that is mounted to the buffer moving bracket and that abuts against the second half of the inner surface of the casing, and at least one cushion member that is mounted to the buffer rotating bracket and that abut against the buffer moving bracket, the cushion member being compressed when the buffer abutment wheel abuts against the intermediate portion of the second half, the buffer abutment wheel moving from the intermediate portion to one of the end portions when the upper axle is rotated by the external force, such that the cushion member is switched from a compressed state to an uncompressed state, the uncompressed cushion member being for damping the rotation of the upper axle when the upper axle rotates back to the original position.

8. The rotation device as claimed in claim 7, wherein the second half of the inner surface of the casing is arc-shaped.

9. The rotation device as claimed in claim 7, wherein the second half of the inner surface of the casing further has two circular arc sections that respectively extend from the end portions toward the intermediate portion, and a flat section that is connected between the circular arc sections, the flat section being formed with a recess that is located at the intermediate portion, the cushion member being compressed when the buffer abutment wheel engages the recess, the buffer abutment wheel disengaging from the recess and moving from the intermediate portion of the inner surface to one of the end portions along the flat section and one of the circular arc sections when the upper axle is rotated by the external force, such that the cushion member is switched from a compressed state to an uncompressed state, the uncompressed cushion member being for damping the rotation of the upper axle when the upper axle rotates back to the original position.

10. The rotation device as claimed in claim 1, wherein the lock member is configured as an electromagnetic lock, the lock portion having a lock tongue that is movable in a top-bottom direction, the lock unit further including a mounting casing that is mounted to the base seat and that permits the lock member to be mounted thereto, and a switch plate that is located above the lock plate, the lock plate being further formed a second lock groove that is angularly spaced apart from the first lock groove, and at least one protruding block that protrudes upwardly, the second lock groove being in a form of a quarter circular arc, the switch plate being formed with two engaging grooves for the protruding block to engage therewith, the lock plate being operable to rotate so as to align a selected one of the first lock groove and the second lock groove with the lock portion of the lock member in the top-bottom direction such that the lock portion of the lock member is operable to move into the selected one of the first lock groove and the second lock groove, the protruding block of the lock plate is operable to engage a selected one of the engaging grooves of the switch plate for preventing relative rotation between the lock plate and the switch plate.

11. The rotation device as claimed in claim 1, wherein the lock member is configured as an electromagnetic lock, the lock portion having a lock tongue that is movable in a top-bottom direction, and a slide block that is co-movably connected to the lock tongue, the lock unit further including a mounting casing that is mounted to the base seat and that permits the lock member to be mounted thereto, and a switch plate that is located above the lock plate, the lock plate being further formed a second lock groove that is angularly spaced apart from the first lock groove, and at least one protruding block that protrudes upwardly, the second lock groove being in a form of a quarter circular arc, the switch plate being formed with two engaging grooves for the protruding block to engage therewith, the lock plate being operable to rotate so as to align a selected one of the first lock groove and the second lock groove with the slide block of the lock member in the top-bottom direction such that the slide block of the lock member is able to moved by the lock tongue into the selected one of the first lock groove and the second lock groove, the protruding block of the lock plate is operable to engage a selected one of the engaging grooves of the switch plate for preventing relative rotation between the lock plate and the switch plate.

12. The rotation device as claimed in claim 1, wherein the lock unit further includes a mounting casing that is mounted to the base seat and that permits the lock member to be mounted thereto, and a switch plate that is located above the lock plate, the lock member being configured as an electromagnetic lock, the lock portion having a lock tongue that is movable in a top-bottom direction, and a pivot rod that is connected to the lock tongue and that has an end pivotally connected to the mounting casing, the lock plate being further formed a second lock groove that is angularly spaced apart from the first lock groove, and at least one protruding block that protrudes upwardly, the second lock groove being in a form of a quarter circular arc, the switch plate being formed with two engaging grooves for the protruding block to engage therewith, the lock plate being operable to rotate so as to align a selected one of the first lock groove and the second lock groove with the pivot rod in the top-bottom direction such that pivot rod is operable to move into the selected one of the first lock groove and the second lock groove, the protruding block of the lock plate is operable to engage a selected one of the engaging grooves of the switch plate for preventing relative rotation between the lock plate and the switch plate.

13. A rotation device adapted for a turnstile, comprising:

a base seat;

an axle unit including an upper axle that extends into the base seat, and a lower axle that extends into the base seat and that is located below the upper axle;

a lower rotating module including a lock unit, and an outer barrel that is disposed in the base seat and that is penetrated by the lower axle, the lock unit including a lock plate that is sleeved on the lower axle, and a lock member that is mounted to the base seat, the lock plate being formed with a first lock groove, the lock member having a lock portion that is operable to move into the first lock groove; and an upper rotating module disposed in the base seat and co-rotatably sleeved on the upper axle, the upper rotating module being able to be driven by the upper axle to rotate relative to the lower rotating module;

wherein the upper rotating module includes a restoring unit that permits the upper axle to extend therein, the upper axle being at an original position when the upper axle is not rotated by an external force, the restoring unit being for restoring the upper axle to the original position after the upper axle is rotated; and wherein the base seat includes a first casing that accommodates the restoring unit, the first casing having a first inner surface, the first inner surface defining an elliptic first opening that extends in a top-bottom direction, the first opening having two opposite major axial ends and two opposite minor axial ends, a distance between the major axial ends being longer than that between the minor axial ends, the restoring unit including a restoring rotating bracket that is co-rotatably connected to and penetrated by the upper axle, two restoring moving brackets that are movably mounted to the restoring rotating bracket, two restoring abutment wheels that are respectively mounted to the restoring moving brackets and that abut against the first inner surface of the first casing, and at least one restoring resilient member that is disposed between the restoring moving brackets, the restoring unit being at an original position when the restoring unit is not rotated, rotation of the upper axle driving rotation of restoring unit such that the restoring abutment wheels of the restoring unit move from the major axial ends to the minor axial ends, and that the restoring moving brackets are pushed by the first inner surface of the first casing to approach each other and to compress the restoring resilient member, a restoring force generated by the restoring resilient member serving for rotating the upper axle back to the original position and rotating the restoring unit back to the original position.

14. A rotation device adapted for a turnstile, comprising:

a base seat;

an axle unit including an upper axle that extends into the base seat, and a lower axle that extends into the base seat and that is located below the upper axle;

a lower rotating module including a lock unit, and an outer barrel that is disposed in the base seat and that is penetrated by the lower axle, the lock unit including a lock plate that is sleeved on the lower axle, and a lock member that is mounted to the base seat, the lock plate being formed with a first lock groove, the lock member having a lock portion that is operable to move into the first lock groove; and an upper rotating module disposed in the base seat and co-rotatably sleeved on the upper axle, the upper rotating module being able to be driven by the upper axle to rotate relative to the lower rotating module;

wherein the lock member is configured as an electromagnetic lock, the lock portion having a lock tongue that is movable in a top-bottom direction, the lock unit further including a mounting casing that is mounted to the base seat and that permits the lock member to be mounted thereto, and a switch plate that is located above the lock plate, the lock plate being further formed a second lock groove that is angularly spaced apart from the first lock groove, and at least one protruding block that protrudes upwardly, the second lock groove being in a form of a quarter circular arc, the switch plate being formed with two engaging grooves for the protruding block to engage therewith, the lock plate being operable to rotate so as to align a selected one of the first lock groove and the second lock groove with the lock portion of the lock member in the top-bottom direction such that the lock portion of the lock member is operable to move into the selected one of the first lock groove and the second lock groove, the protruding block of the lock plate is operable to engage a selected one of the engaging grooves of the switch plate for preventing relative rotation between the lock plate and the switch plate.

* * * * *